US012132621B1

(12) United States Patent
Brebner et al.

(10) Patent No.: US 12,132,621 B1
(45) Date of Patent: Oct. 29, 2024

(54) MANAGING NETWORK SERVICE LEVEL THRESHOLDS

(71) Applicant: Hewlett Packard Enterprise Development LP, Spring, TX (US)

(72) Inventors: Gavin Brebner, St. Martin d'Uriage (FR); Anne Moelle, Ballybrit (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/500,300

(22) Filed: Nov. 2, 2023

(30) Foreign Application Priority Data

Sep. 29, 2023 (EP) ..................... 23306651

(51) Int. Cl.
  *G06F 15/173* (2006.01)
  *H04L 41/16* (2022.01)
  *H04L 41/50* (2022.01)
  *H04L 41/5025* (2022.01)

(52) U.S. Cl.
  CPC .......... *H04L 41/5032* (2013.01); *H04L 41/16* (2013.01); *H04L 41/5025* (2013.01)

(58) Field of Classification Search
  CPC .. H04L 41/5032; H04L 41/16; H04L 41/5025
  USPC ......................................................... 709/226
  See application file for complete search history.

(56) References Cited

U.S. PATENT DOCUMENTS 10,277,487 B2   4/2019   Kakadia et al.
11,212,195 B1  12/2021   Tamir et al.
2016/0028599 A1* 1/2016 Vasseur ................ H04L 41/149
                                                    370/252
2016/0088006 A1* 3/2016 Gupta .................. H04L 41/149
                                                    706/12
2019/0028909 A1* 1/2019 Mermoud ............. H04W 16/18
2020/0089533 A1   3/2020 Guha
2021/0311655 A1  10/2021 Benjamin et al.
2021/0357280 A1  11/2021 Long et al.
2021/0392202 A1* 12/2021 Henning ............... H04L 41/145
2022/0052905 A1* 2/2022 Vasseur ................. H04L 41/14
2022/0094606 A1* 3/2022 Casey .................... H04L 43/04

(Continued)

FOREIGN PATENT DOCUMENTS

WO   2020/252390 A1   12/2020
WO   2021/188021 A1    9/2021

*Primary Examiner* — Alan S Chou
(74) *Attorney, Agent, or Firm* — Slater Matsil, LLP

(57) ABSTRACT

In certain embodiments, a computer-implemented method includes monitoring, over time, values for a service metric associated providing a computerized service over a communication network and evaluating, according to a statistical model, the values for the service metric to determine whether the values are anomalous values. The statistical model includes a predicted distribution of the values for the service metric and a normal value range within the predicted distribution of the values for the service metric. Anomalous values may be values for the service metric outside the normal value range. The method includes detecting a performance issue with the computerized service and determining, in response to detecting the performance issue, whether one or more of the values for the service metric are anomalous. The method includes automatically setting, in accordance with whether one or more of the values are anomalous, a value of a service level threshold for the service metric.

18 Claims, 7 Drawing Sheets

(56) References Cited

U.S. PATENT DOCUMENTS

| | | |
|---|---|---|
| 2022/0237102 A1 | 7/2022 | Bugdayci et al. |
| 2022/0261405 A1 | 8/2022 | Shuster et al. |
| 2022/0350724 A1 | 11/2022 | Kumar Kn et al. |

* cited by examiner

MANAGING NETWORK SERVICE LEVEL THRESHOLDS

CROSS-REFERENCE TO RELATED APPLICATIONS

This application is a claims priority to European Application No. 23306651.3, filed on Sep. 29, 2023, the contents of which are hereby incorporated by reference in their entireties.

BACKGROUND

Certain computing systems have been designed to provide one or more services over a computer network. For example, these services may include the provision of any suitable combination of hardware resources (e.g., processing resources, storage resources, networking resources, etc.), application resources, management resources (e.g., resource management resources), and/or other types of services provided over the computer network. A service provider may provide some or all of these services to one more customers. The computing systems that implement or are otherwise used to provide these services may include distributed computing systems such as, for example, cloud systems, multi-cloud systems, hybrid cloud systems, or any other suitable types of distributed computing systems.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Figure 1:
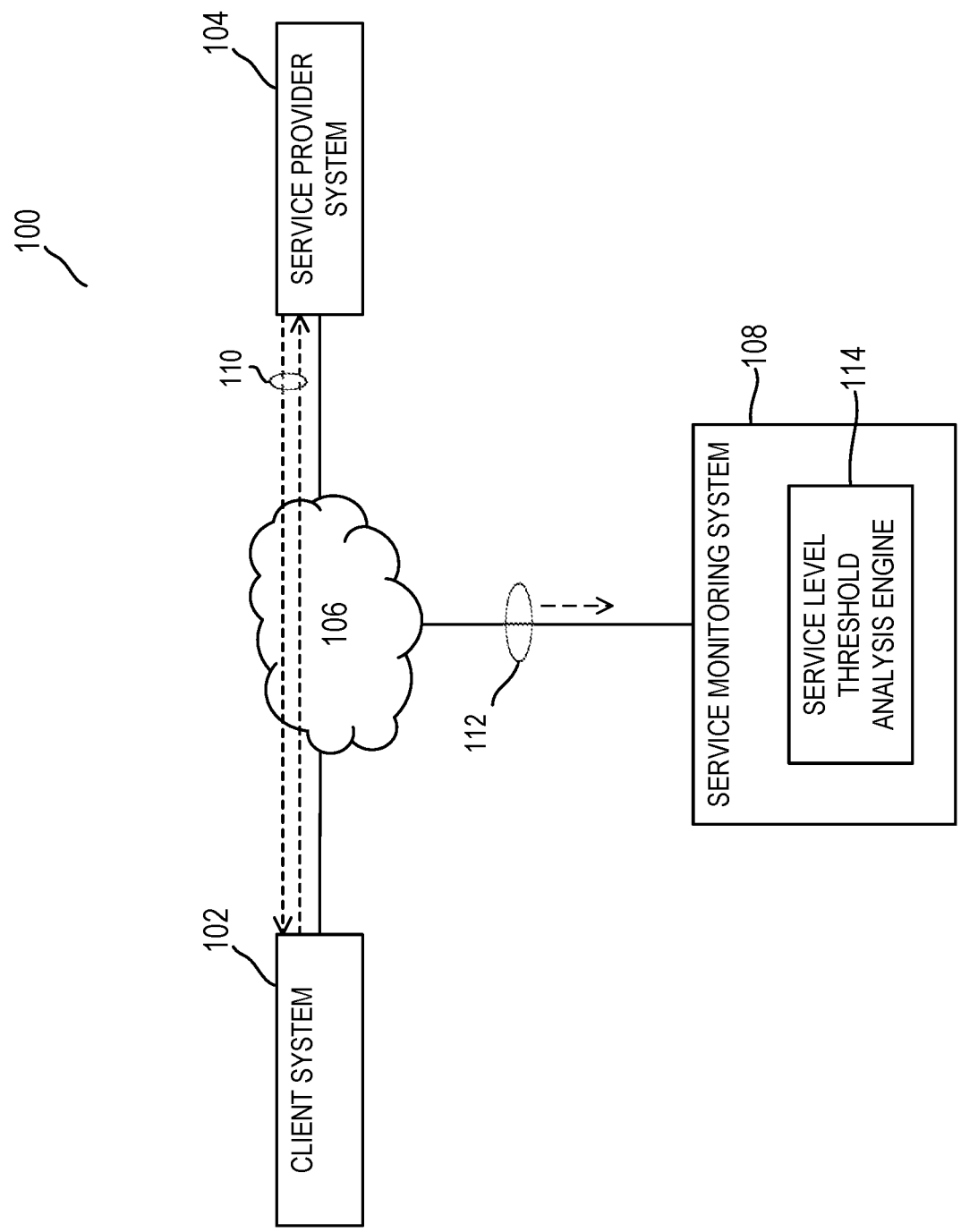
FIG. 1 illustrates an example system for managing service level thresholds, according to certain embodiments.

A service provider that provides computerized services over a communication network may monitor the services to attempt to ensure that the services are being provided to customers at a satisfactory level. To that end, a system may track one or more service metrics related to performance of the service. At least some of those service metrics may in some way reflect a customer's experience with the service.

Site reliability engineers (SREs) may track service metrics, which may be referred to as service level indicators (SLIs), related to a customer's interaction with a service, and create service level threshold values, which may be referred to as service level objectives (SLOs), to distinguish acceptable values from non-acceptable service metric values for those service metrics. The service level thresholds may be used to identify whether or not a customer is likely to be happy with a service. A service that breaches (e.g., exceeds) the service level thresholds may be considered as failing to provide an acceptable service to customers, and action may be appropriate. Typically, as the service metric values for a service metric approach or cross the service level threshold value for that service metric, alerts may be generated to the service owners/operators, potentially prompting action to repair a problem.

Service level thresholds may be set manually by SREs or other users based on an understanding of the service metrics being tracked. However, SREs may be encouraged to measure immense amounts of service level metrics—that is, to identify large numbers of service metrics—so defining and maintaining service level thresholds for each service metric at an appropriate value may be challenging, particularly for large complex environments. That is, as the number of service metrics increases, maintaining appropriate values for the respective service level thresholds can involve significant effort.

Additionally or alternatively, systems change over time, and as the underlying system changes, the existing service level threshold definitions may become invalid or at least non-optimal. For example, systems may be changed to support new features or increased scalability. Changes can also stem from mandated changes of third-party/open source components. Due at least in part to these system changes, it may be appropriate to modify service level thresholds, but it is not always clear which service level thresholds should be changed or how those service level thresholds should be changed.

Certain embodiments provide improved techniques for maintaining service level thresholds. For example, certain embodiments provide techniques for automatic service level threshold adjustment. Certain embodiments provide a statistical-analysis-based system, using concepts from data engineering and machine learning (sometimes abbreviated as "ML" throughout this disclosure and accompanying figures) to derive and modify service level threshold values based on observed behavior, and knowledge of when the system is deemed to be misbehaving (e.g., support calls, other service level thresholds being breached, infrastructure failure events, etc.).

Certain embodiments may manage service level thresholds in one or more phases. For example, certain embodiments may manage service level thresholds using a service level threshold autotuning phase during which values for service level thresholds are automatically set (e.g., adjusted) according to an analysis performed using one or more statistical models for managing service level thresholds. In certain embodiments, the results of setting the values of service level thresholds for service metrics may be stored, including potentially changes to the value of the service level threshold, timing of changes to the service level threshold, the circumstances that led to the changes of the service level threshold, and/or any other suitable information. In certain embodiments, results of setting the values of service level thresholds for service metrics may be stored as time series data.

As another example, certain embodiments may manage service level thresholds using a machine learning analysis phase during which changes to values for service level thresholds are analyzed, using one or more machine learning models, to identify patterns in the changes to the values of the service level thresholds. In certain embodiments, the time series data is evaluated, using one or more machine learning models, to identify patterns in the changes to the values of the service level threshold.

Certain embodiments may provide for improved values of service level thresholds, which may improve overall system performance. Rather than solely relying on the possibly sporadic manual intervention of SREs or other users to modify service level thresholds, certain embodiments are able to automatically tune values for service level thresholds based on statistical models that provide more reliable and up-to-date information than may be possible with manual user intervention. In certain embodiments, by autotuning values for one or more service level thresholds, the burden on SRE or other users to manually set service level thresholds (e.g., SLOs) for service metrics (e.g., SLIs) may be reduced or eliminated. This may be particularly useful for service metrics whose impact on the end customer experience is currently uncertain. Certain embodiments may provide traceability of changes to service level thresholds, such as by maintaining logs of changes to values for service level thresholds.

Certain embodiments may allow values for one or more service level thresholds to "float" during specific tests designed to provoke poor service behaviour, and for the values of those one or more service level thresholds to thereby be set via system testing (e.g., via the autotuning mechanism). Certain embodiments may allow SRE engineers or other users to concentrate on a specific subset of vital service level thresholds for manual intervention and let the system set and adjust (via the automated autotuning mechanism) other service level thresholds. Certain embodiments may allow service level thresholds to be frozen manually if desired at any point. Certain embodiments may provide time series analysis on of values for service level thresholds, as adjusted using the autotuning mechanism, which may provide insights and/or predictions.

FIG. 1 illustrates an example system 100 for managing service level thresholds, according to certain embodiments. In the illustrated example, system 100 includes client system 102, service provider system 104, communication network 106, and service monitoring system 108. Although system 100 is illustrated and described as including particular components, system 100 may include any suitable components, according to particular needs.

Client system 102 may include any suitable types and numbers of electronic processing devices, including a single processing device, multiple processing devices, multiple processing devices that communicate over a computer network, an enterprise network, or any other suitable type(s) of processing devices in any suitable arrangement, some of which may overlap in type. In certain embodiments, client system 102 may be one of multiple client systems 102 that interact with service provider system 104.

Service provider system 104 may include any suitable types and numbers of electronic processing devices, including a single processing device, multiple processing devices, multiple processing devices that communicate over a computer network, an enterprise network, or any other suitable type(s) of processing devices in any suitable arrangement, some of which may overlap in type.

Service provider system 104 may provide one or more computerized services 110 (referred to throughout the remainder of this disclosure as "services 110" or the like for simplicity) to client system 102 over communication network 106. Services 110 provided by service provider system 104 may include any type of electronic service that may be provided to client system 102 over communication network 106. For example, services 110 may include one or more of cloud services, multi-cloud services, hybrid cloud services, web services, network hosting services, data storage services, data processing services, high performance computing services, or any other suitable type(s) of electronic services, some of which may overlap in type.

Communication network 106 facilitates wireless and/or wireline communication. Communication network 106 may communicate, for example, IP packets, Frame Relay frames, Asynchronous Transfer Mode (ATM) cells, voice, video, data, and other suitable information between network addresses. Communication network 106 may include any suitable combination of one or more local area networks (LANs), radio access networks (RANs), metropolitan area networks (MANs), wide area networks (WANs), mobile networks (e.g., using WiMax (802.16), WiFi (802.11), 3G, 4G, 5G, or any other suitable wireless technologies in any suitable combination), all or a portion of the global computer network known as the Internet, and/or any other communication system or systems at one or more locations, any of which may be any suitable combination of wireless and wireline.

System 100 includes service monitoring system 108, which may monitor the performance of services 110. Service monitoring system 108 may obtain service metric data 112 related to services 110. Service monitoring system 108 may obtain service metric data 112 from one or more agents deployed throughout system 100 (e.g., at client system 102, service provider system 104, and/or network 106) and/or in any other suitable manner. For example, service monitoring system 108 may poll the agents for service metric data 112 at regular or irregular time intervals. Additionally or alternatively, the agents may automatically communicate service metric data 112 to service monitoring system 108 at regular or irregular time intervals. Such agents may be implemented using any suitable combination of hardware, firmware, and software. Additionally, although described as "agents," this disclosure contemplates service monitoring system 108 obtaining service metric data 112 in any suitable manner or combination of manners.

Service metric data 112 may include one or more of service metric values for one or more service metrics, timestamp information, and/or any other suitable information. Service metrics may be parameters that capture aspects of the performance of services 110. For example, service metrics may be considered service level indicators (SLIs). In certain embodiments, service metrics measure aspects of a user's (e.g., a user of client system 102) interaction with service 110 to determine whether the user may be experiencing or about to experience a problem with service 110.

Some specific examples of service metrics may include the number of times an application programming interface (API) call results in a 500 error, latency or response time (e.g., how long does it take for the user to receive a response from service provider system 104, such as latency to load a user interface (e.g., a web page), latency for API calls, amount of time a virtual machine (VM) takes to start, or an amount of time for a Kubernetes cluster to create), error rate or quality, uptime, availability, and/or how many times a running VM stops running and is restarted due to maintenance operation or another service disruption. Although specific examples have been described, the service metrics may include any suitable service metrics.

In certain embodiments, service metrics are measurable as numeric values, meaning that in such embodiments, the service metric values are numbers. Service metrics may have any units appropriate for the type of measurement being made for the service metric. For example, the units of the service metric could be time, a percentage, or any other suitable type of measurement.

To the extent service metric data 112 includes timestamp information, the timestamp information may indicate the time at which measurements are taken (e.g., resulting in associated one or more service metric values), the time at which the one or more service metric values (e.g., resulting from the associated measurements) are received by service monitoring system 108, and/or any other suitable time information.

Service monitoring system 108 may maintain respective service level thresholds for some or all of the service metrics. The service level threshold for a corresponding service metric may establish a goal for the corresponding service metric. For example, the service level thresholds may be considered service level objectives (SLOs). In certain embodiments, service monitoring system maintains a separate service level threshold for each service metric, though the values for different service level thresholds might be the same or different.

Service monitoring system 108 may compare the service metric values for a service metric to the service level threshold for that service metric to determine whether the service metric values for the service metric breach the service level threshold for that service metric.

Service monitoring system 108 may determine whether the service metric values for the service metric breach the service level threshold for that service metric in any suitable manner. For example, service monitoring system 108 may compare individual service metric values, multiple service metric values (e.g., over a particular period of time and/or a particular number of service metric values), or a value (e.g., an average) of multiple service metric values to the service level threshold for that service metric to determine whether the service metric values for the service metric breach the service level threshold for that service metric. As another example, the one or more service metric values for a service metric breaching a service level threshold for that service metric may include the one or more service metric values exceeding (e.g., being greater than, or greater than or equal to, depending on the implementation) the current value of the service level threshold, the one or more service metric values falling below (e.g., being less than, or less than or equal to, depending on the implementation) the current value of the service level threshold, or any other suitable implementation.

In certain embodiments, if service monitoring system 108 determines that the values for a service level metric breach the service level threshold for that service level metric, then it may be considered that service provider system 104 is failing to deliver, or may be in danger of failing to deliver, service 110 to client system 102 at a desired level, at least as to the aspect of service 110 being measured by that service metric.

As described above, over time, it may be appropriate to adjust values for service thresholds. Such adjustments could be due to changes in service provider system 104, changes to client system 102 (or to other client systems 102, such as when service provider system 104 serves multiple client systems 102), changes to communication network 106, the time at which service provider system 104 is providing services 110 (e.g., time of day, time of month, time of year), or for any other suitable reason or combination of reasons. These changes could affect what might be considered "normal" for the service metric values for a service metric, and thus may warrant a change in an appropriate value for the service level threshold for that service metric. Of course, multiple service metrics and service level thresholds could be affected.

Service monitoring system 108 may include service level threshold analysis engine 114, which may be configured to evaluate the service level thresholds periodically to determine how to set respective values of the service level thresholds. For example, service level threshold analysis engine 114 may evaluate the service level thresholds continuously, as new service metric values (e.g. each new service metric value, a particular number of service metric values, etc.) for the service metric that corresponds to a particular service level threshold is received, or at any other suitable interval.

What constitutes setting a service level threshold may vary under different circumstances. For example, if no service level threshold has been established for a particular service metric, in certain scenarios setting a service level threshold may include establishing the service level threshold (e.g., defining a variable for the service level threshold) and setting the service level threshold to an initial value. As another example, if a service level threshold has been established for a particular service metric, setting a service level threshold may include leaving a current value of the service level threshold unchanged, adjusting the current value of the service level threshold by a predefined adjustment amount, or taking another suitable action with respect to the service level threshold.

Service level threshold analysis engine 114 may manage service level thresholds in one or more phases. These phases may run concurrently or at different times, as appropriate.

For example, service level threshold analysis engine 114 may manage service level thresholds using a service level threshold autotuning phase during which service level threshold analysis engine 114 may automatically set (e.g., adjust) a value of a service level threshold according to an analysis performed using a statistical model for managing service level thresholds. In certain embodiments, as part of determining how to set a service level threshold, service level threshold analysis engine 114 may analyze service metric values for a service metric according to one or more statistical models to identify anomalous service metric values. The statistical model may include a predicted distribution of the service metric values for a service metric and a normal value range within the predicted distribution of the service metric values for the service metric. Anomalous values may be service metric values that fall outside the normal value range. Additional details are described with reference to FIGS. 2-5.

In certain embodiments, service level threshold analysis engine 114 may store results of setting the values of service level thresholds for service metrics. For example, service level threshold analysis engine 114 may store historical values of the service level threshold, which may include changes to the value of the service level threshold, timing of changes to the service level threshold, the circumstances that led to the changes of the service level threshold, and/or any other suitable information. In certain embodiments, service level threshold analysis engine 114 may store results of setting the values of service level thresholds for service metrics as time series data.

As another example, service level threshold analysis engine 114 may manage service level thresholds using a machine learning analysis phase during which service level threshold analysis engine 114 may analyze, using one or more machine learning models, changes to values for a service level threshold to identify patterns in the changes to the values of the service level threshold. In certain embodiments, service level threshold analysis engine 114 may evaluate, using one or more machine learning models, the time series data to identify patterns in the changes to the values of the service level threshold. Additional details are described with reference to FIGS. 2-3 and 6.

Service monitoring system 108 and/or service level threshold analysis engine 114 may be implemented using any suitable combination of hardware, firmware, and software. Although illustrated separately from client system 102 and service provider system 104, service monitoring system 108 may be implemented as part of or separate from client system 102 and/or service provider system 104.

Figure 2:
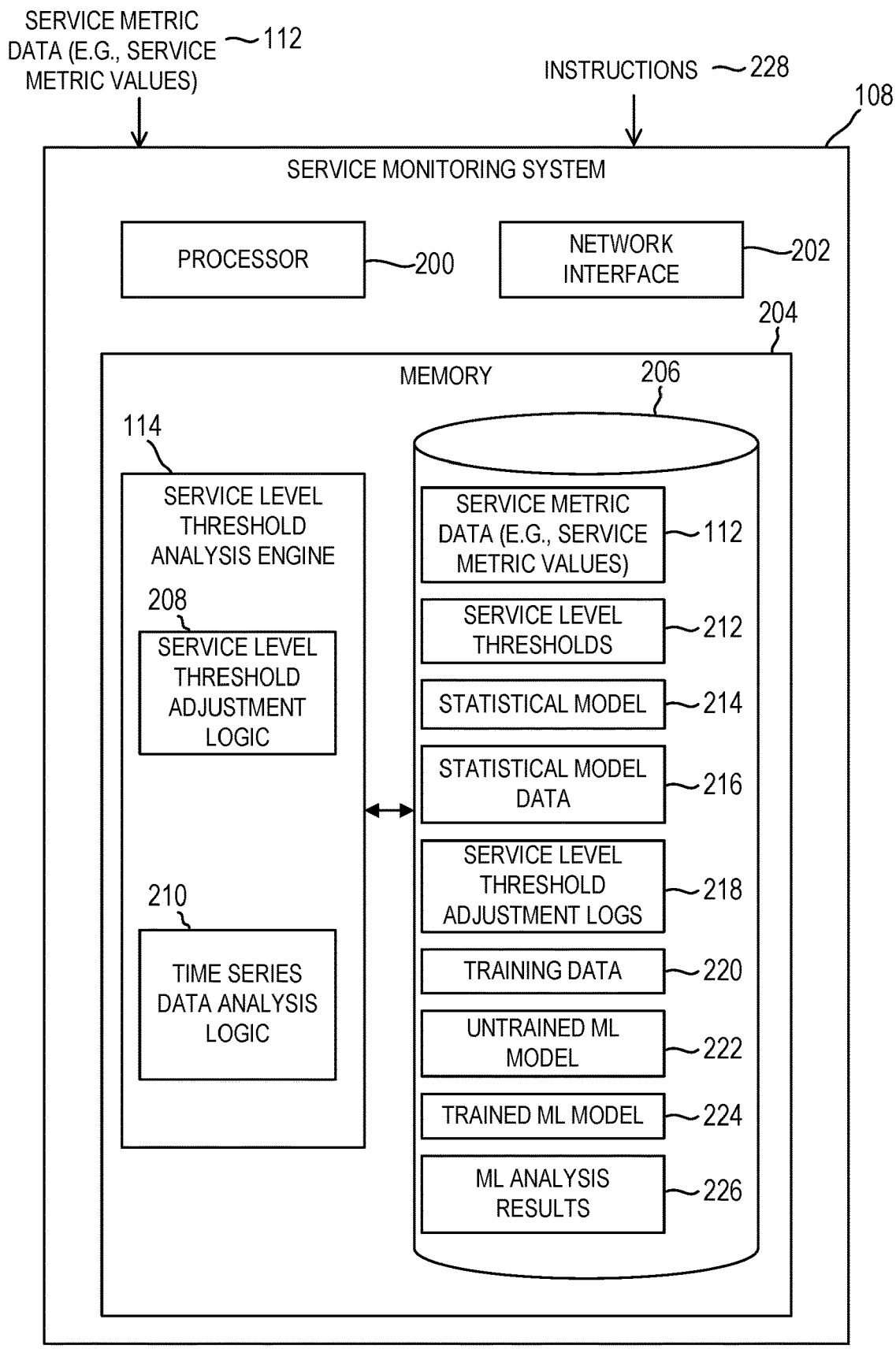
FIG. 2 illustrates details of example service monitoring system, according to certain embodiments.

FIG. 2 illustrates details of example service monitoring system 108, according to certain embodiments. Although a particular implementation of service monitoring system 108 is illustrated and described, this disclosure contemplates any suitable implementation of service monitoring system 108.

Service monitoring system 108 may include processor 200, network interface 202, and memory 204. Although described in the singular for ease of description, service monitoring system 108 may include one or more processors 200, one or more network interfaces 202, and one or more memories 204.

Processor 200 may be any component or collection of components adapted to perform computations and/or other processing-related tasks. Processor 200 can be, for example, a microprocessor, a microcontroller, a control circuit, a digital signal processor, a field-programmable gate array (FPGA), an application-specific integrated circuit (ASIC), a system-on-chip (SoC), a graphics processing unit (GPU), or combinations thereof. Processor 200 may include any suitable number of processors, or multiple processors may collectively form a single processor 200. Processor 200 may work, either alone or with other components of system 100 (see FIG. 1), to provide a portion or all of the functionality of service monitoring system 108 described herein.

Network interface 202 represents any suitable computer element that can receive information from a communication network, transmit information through a communication network, perform suitable processing of the information, communicate to other components (e.g., of system 100 of FIG. 1), or any combination of the preceding. Network interface 202 represents any port or connection, real or virtual, including any suitable combination of hardware, firmware, and software, including protocol conversion and data processing capabilities, to communicate through a LAN, WAN, or other communication system that allows information to be exchanged with devices of system 100. Network interface 202 may facilitate wireless and/or wired communication.

Memory 204 may include any suitable combination of volatile memory, non-volatile memory, and/or virtualizations thereof. For example memory may include any suitable combination of magnetic media, optical media, random access memory (RAM), read-only memory (ROM), removable media, and/or any other suitable memory component. Memory 204 may include data structures used to organize and store all or a portion of the stored data. In general, memory 204 can store any data used by or accessible to service monitoring system 108.

Memory 204 may include storage device 206. Memory 204 may include any suitable number of storage devices 206, and the contents of storage devices 206 may be spread across multiple storage devices 206, if appropriate. Although storage device 206 is shown to be a part of memory 204, storage device 206 may be a part of or separate from memory 204. Additionally, one or more of storage devices 206 may be separate and potentially remote from the one or more processing devices on which service monitoring system 108 operates. Furthermore, memory 204 and/or storage device 206 may be further subdivided or combined in any suitable manner.

In the illustrated example, memory 204 stores service level threshold analysis engine 114, which may include logic for managing network service level thresholds. In certain embodiments, service level threshold analysis engine 114 includes service level threshold adjustment logic 208 and time series data analysis logic 210. Furthermore, in the illustrated example, storage device 206 stores service metric data 112, service level thresholds 212, statistical model 214, statistical model data 216, service level threshold adjustment logs 218, training data 220, untrained ML models 222, trained ML models 224, and ML analysis results 226.

Turning to service level threshold analysis engine 114, service level threshold analysis engine 114 may be configured to evaluate the service level thresholds periodically to determine how to set respective values of the service level thresholds. As described above, service level threshold analysis engine 114 may manage service level thresholds in one or more phases. In the illustrated example of FIG. 2, service level threshold analysis engine includes 114 includes service level threshold adjustment logic 208 and time series data analysis logic 210 that are each configured to perform respective phases of managing service level thresholds. For example, service level adjustment logic 208 may implement a service level threshold autotuning phase that includes automatically setting (e.g., adjusting) a value of a service level threshold 212 according to an analysis performed using a statistical model 214. As another example, time series data analysis logic 210 may include analyzing, using one or more ML models (e.g., trained ML models 224), changes to values for a service level threshold 212 to identify patterns in the changes to the values of the service level threshold 212. These phases may run concurrently or at different times, as appropriate.

Service level threshold adjustment logic 208 may be configured to manage service level thresholds 212 using a service level threshold autotuning phase during which service level threshold adjustment logic 208 may automatically set a value of a service level threshold 212 according to an analysis performed using a statistical model 214 for managing service level thresholds 212.

In certain embodiments, as part of determining how to set a service level threshold, service level threshold analysis engine 114 may analyze service metric values for a service metric according to a statistical model 214 to identify anomalous service metric values. Statistical model 214 may be configured using statistical model data 216. Statistical model 214 may use a predicted distribution of the service metric values for a service metric and a normal value range within the predicted distribution of the service metric values for the service metric. Anomalous values may be service metric values that fall outside the normal value range.

The following describes an example of statistical model 214 and statistical model data 216. It should be understood that this is just an example, and statistical model 214 and/or statistical model data 216 may be implemented in other suitable ways to identify anomalous service metric values for service metrics. Any particular values for statistical model 214 and/or statistical model data 216 identified as part of this description are for example purposes only. For purposes of this example, it will be assumed that each service level metric maps uniquely to one service level threshold 212; however, this is for example purposes only.

The collection of data being analyzed using the statistical model may be referred to as the population. In certain embodiments, the data being analyzed may be, for example, the service metric values for a service metric in this example. The collected service metric values for a particular service metric over time may represent the population for that service metric.

Configuring statistical model 214 may include, for each service metric for which service metric values are being evaluated for anomalous values, determining a distribution to be used (e.g., normal distribution, Poisson distribution, etc.) for evaluating the service metric values; determining a confidence interval and significance level for the service metric; defining a hypothesis according to the distribution, confidence interval, and significance level; and evaluating the hypothesis to determine whether or not the null hypothesis can be rejected. Thus, in certain embodiments, statistical model 214 and/or statistical model data 216 may include, for each service metric, a distribution, a confidence interval, a significance level, a null hypothesis, and an alternative hypothesis. Each of these are now described in greater detail.

For each service metric, statistical model 214 and/or statistical model data 216 may include a predicted distribution of the values for the service metric and a normal value range within the predicted distribution of the values for the service metric. The predicted distribution of the values for a service metric may be a mathematical function describing the probability of different possible values of a variable (e.g., the service metric values for the service metric at issue). The predicted distribution of the values for the service metric could be, for example, the so-called normal distribution (N(μ, σ), a Poisson distribution (λ), or another suitable distribution. The predicted distribution may reflect the expectation for how the service metric values for a service metric may vary. The appropriate distribution may be different for different service metrics and/or may vary for a given service metric at different times.

As part of statistical model 214 and statistical model data 216, a normal value range may be defined. The normal value range may be a portion of the predicted distribution. The normal value range may be defined according to a hypothesis, a significance level, and a confidence interval.

To that end, statistical model 214 and statistical model data 216 may include a definition of a hypothesis for each service metric. The purpose of the hypothesis is to obtain a single conclusion of statistical significance or no statistical significance at the alpha (a) level. The hypothesis test is used to obtain a comparison with a pre-specified hypothesis, the comparison including whether a service metric value for a service metric is less than or equal to an absolute value of the threshold value X, where X defines the normal value range for service metric values of the service metric (e.g., the service metric value is in the range [−X, X]), at a significance level a. As an example, with a normal distribution, the normal value range may be −2 to 2.

The confidence interval, or confident level, may be a range of plausible values for the population. For example, the confidence level may be defined, in part, by the significance level, and may correspond to the normal value range within the predicted distribution of values for the service metric. The confidence level may be used to describe the magnitude of an effect (e.g., mean difference) of a particular value (e.g., a particular service metric value). For example, for a 95% confidence interval, 95% of the values (e.g. the service metric values for a service metric) fall within the specified interval. The confidence level may have any suitable value, potentially expressed as a percentage, but some example values include 90%, 95%, and 99%.

Taking a 95% confidence level as an example, the confidence level means there is a 95% confidence interval that the mean is a range with an upper and lower number calculated from a sample or in another suitable manner. Because the true population mean is unknown (e.g., it potentially changes over time as new data is reported), this range describes the possible values that a mean could be. If multiple samples are drawn from the same population and a 95% confidence interval is calculated for each sample, the system would expect the population mean to be found within 95% of these confidence intervals. That is, 95% of the sample means for a specified sample size will lie within 1.96 standard deviations of the hypothesis population mean. Similarly, for a 99% confidence interval, 99% of the sample means will lie within the 2.5 standard deviations from the population mean.

In certain embodiments, a confidence interval can be calculated by adding and subtracting the margin of error to a point estimate. The general form of the confidence interval estimate of a population mean may be X bar +/−margin of error. In certain embodiments, to calculate the interval estimate, the following formula may be used:

$$\text{Interval Estimate} = \bar{x} \pm Z \frac{s}{\sqrt{n}},$$

where x bar is the sample mean, z is the number of standard deviations from the sample mean, s is the standard deviation in the sample, and n is the size of the sample.

The significance level (a) for a hypothesis test may be expressed as a percentage (e.g., a=5%) and may represent a threshold for rejecting the null hypothesis. In certain embodiments, the significance level is 5%, but the significance level could be 1% (or 0.01), 5% (or 0.05), 10% (or 0.1), or any other suitable value. The significance level may represent that probability/likelihood that a true population parameter (e.g., a value of a service metric) lies outside the confidence interval. The confidence interval may be expressed as 1-a.

Configuring statistical model 214 may include defining hypotheses for each service metric. The hypotheses may formulate the service metrics as assumptions about a statistical model of the population (service metric values for the service metric).

In certain embodiments, the hypotheses may be a null hypothesis (H0) and an alternative hypothesis (HA), which may be expressed as follows:

H0: |service metric value|>|x|, meaning the service metric value for the service metric is expected to be outside the range [−X, X]; and HA: |service metric value|≤|X|, meaning the service metric value for the service metric is expected to be within the range [−X, X].

The null hypothesis may be the assumption that an event will not occur (e.g., that there is no effect on the population). The null hypothesis may reflect an assertion that held as true unless sufficient statistical evidence to conclude otherwise exists. If the sample (e.g., one or more service metric values for a service metric) provides enough evidence against the claim that there is no effect on the population (e.g., p≤a), then the null hypothesis can be rejected. Otherwise, the analysis fails to reject the null hypothesis. The alternative hypothesis may be the logical opposite of the null hypothesis. The acceptance of the alternative hypothesis follows the rejection of the null hypothesis.

Additionally, statistical model data 216 may include, for each service level threshold, a formula for calculating a predetermined initial value for the service level threshold, which may be referred to as the threshold_edge value or SLO_edge value. In certain embodiments, the formula for calculating the threshold_edge value may be X standard-deviation values from average in the direction of the current setting. Additionally or alternatively, the threshold_edge value may be set manually by an SRE or other suitable user.

Additionally, statistical model data 216 may include, for each service level threshold, a formula for calculating a predetermined adjustment amount for the service level threshold, which may be referred to as the threshold_step value or SLO_step value. The threshold_step value may indicate the amount by which the service level threshold is adjusted, when appropriate. In certain embodiments, the formula for calculating the threshold_step value may be step-size linked to the difference between the service metric value for the service metric and the average (normalized by standard deviation) of the service metric values for the service metric. Additionally or alternatively, the threshold_step value may be set manually by an SRE or other suitable user.

Additionally, statistical model data 216 may include, one or more variables that may be set initially and then adjusted as autotuning is performed. For example, a threshold_breached variable may be a binary variable indicating whether a service level threshold is breached. The service level threshold may be the service level threshold that corresponds to the service metric for which anomalies are being detected or any other suitable service level threshold. As another example, a threshold_manually_set variable may be a binary value indicating whether a service level threshold has been manually set (e.g., by an SRE or other suitable user).

Anomalous values may be values for the service metric that fall outside the normal value range. In other words, if, when evaluating service metric values for a service metric, service level threshold adjustment logic 208 fails to reject the null hypothesis, it may be determined that the service metric value (or service metric values) are anomalous.

Service level threshold adjustment logic 208 may monitor service metric values for the service metrics and evaluate, using statistical model 214, whether one or more service metric values are anomalous. For example, for a given service metric, service level threshold adjustment logic 208 may determine whether one or more service metric values are anomalous by failing to reject the null hypothesis (H0), meaning that the service metric value is not abnormal and is within the expected normal range, or accepting the alternative hypothesis (HA), meaning that the service metric value is anomalous and is outside the expected normal range. In certain embodiments, in this way, service level threshold adjustment logic 208 may identify anomalous one or more service metric values for a service metric.

To the extent service level threshold adjustment logic 208 is evaluating service metric values for multiple service metrics, service level threshold adjustment logic 208 may use the same or different statistical models and/or statistical model data 216 for evaluating whether the service metric values for the service metrics are anomalous.

Service level threshold adjustment logic 208 may store, in a service level threshold adjustment log 218, information associated with the value of the service level threshold 212 and associated values of the service metric. That is, service level threshold adjustment logic 208 may store results of setting the values of service level thresholds 212 for service metrics. For example, service level threshold adjustment logic 208 may store historical values of the service level threshold 212, which may include changes to the value of the service level threshold 212, timing of changes to the service level threshold 212, the circumstances that led to the changes of the service level threshold 212, and/or any other suitable information. In certain embodiments, modifications to service level thresholds are tracked via service level threshold adjustment logs 218, which may allow the system to roll back to prior values for service level thresholds 212, if appropriate.

In certain embodiments, service level threshold analysis engine 114 may store results of setting the values of service level thresholds for service metrics as time series data. For example, service level threshold adjustment log 218 may include time series data for values of the service level threshold 212 over time.

Time series data analysis logic 210 may be configured to manage service level thresholds 212 using a machine learning analysis phase during which time series data analysis logic 210 may analyze, using one or more ML models (e.g., trained ML models 224), changes to values for a service level threshold 212 to identify patterns in the changes to the values of the service level threshold 212. In connection with a machine learning analysis phase for managing service level thresholds 212, storage module 206 may store training data 220, untrained ML model 222, trained ML model 224, and ML analysis results 226. Although described in the singular for simplicity, this disclosure contemplates using one or multiple untrained ML models 222 and one or multiple trained ML models 224, alone or in combination, as may be appropriate for the type of service metric data 112 and/or service level thresholds 212 being analyzed using trained ML models 224 and/or the types of ML analysis results 226 desired.

Training data 220 may include data to be used for training untrained ML model 222 to generate trained ML model 224 and/or to retrain trained ML model 224. Training data 220 may include test service metrics values and/or values for service level thresholds, as time series data. Training data 220 may provide test service metrics values and/or service level thresholds generated under varied circumstances, such as during various operating conditions, various system configurations, various times of day/month/year, and the like to train the appropriate ML models to recognize or otherwise predict patterns in actual service metrics data 112 and/or service level thresholds 212 for services 110. In certain embodiments, some or all of these test service metric values and or service level threshold values may be for service metrics and/or service level thresholds that correspond to service metrics that are measured for services 110 and for which service metric data 112 includes service metric values and for which a service level threshold may be defined. The test service metric values and/or service level threshold values may be generated from actual test environments or simulated test environments.

Time series data analysis logic 210 may include training logic for executing a training phase to train untrained ML model 222 and/or retrain trained ML model 224 using training data 220 to generate trained ML model 224.

Trained ML model 224 are versions of the ML model following training using training data 220. Trained ML model 224 is ready for deployment for use during actual operation of service 110 and service monitoring system 108. Untrained ML model 222 and trained ML model 224 may include any suitable type (or combination of types) of ML models. For example, untrained ML model 222 and trained ML model 224 may use any suitable combination of deep learning, linear regression, logistic regression, regression analysis generally, cluster analysis, neural networks, statistical classification, support vector machine, K-means clustering, supervised learning, autoregressive integrated moving average (ARIMA), Prophet, Long Short-Term Memory, convolutional neural networks, seasonal decomposition, DeepAR, and/or any other suitable type of machine learning models (some of which may overlap in type) to analyze the time series data of service level threshold adjustment logs.

Time series data analysis logic 210 may use trained ML model 224 to analyze actual service level threshold adjustment logs 218, including, for example, time series data associated with the values of service level thresholds 212 and associated service metric data 112 to generate ML analysis results 226. For example, time series data analysis logic 210 may input to trained ML model 224 time series data associated with the values of service level thresholds 212 and associated service metric data 112. Trained ML model 224 may process this information and generate one or more outputs that reflect one or more patterns associated with the analyzed values of the time series data for a service level threshold. This output from ML model 224 may include one or more predictions regarding how detected patterns may continue into the future time frames.

Time series data analysis logic 210 may analyze, using one or more machine learning models (e.g., trained ML models 224), the time series data. The one or more machine learning models (e.g., trained ML models 224) may be trained to identify one or more patterns for the values of the service level thresholds 212. Such patterns may include trends in the values for a service level threshold 212, seasonal features in the values for a service level threshold 212, cyclical patterns in the values for a service level threshold 212, residual patterns in the values for a service level threshold 212, and/or any other suitable patterns.

Trends may include long-running patterns in the time series data for a service level threshold 212. A trend could be an upward trend or a downward trend. Seasonal features in the values for a service level threshold 212 may include repetitive patterns at certain times (e.g., certain times of the day/week/month/year). Cyclical patterns in the values for a service level threshold 212 may include fluctuations that occur in the time series data (e.g., the values of the service level threshold 212 over time) at any time of the year. Residual patterns in the values for a service level threshold may represent an irregular component of the data, such as the data remaining after removing the trends, seasons features, and cyclical patterns of the time series data (e.g., the values of the service level threshold 212 over time).

Time series data analysis logic 210 may output ML analysis results 226, which may be stored in storage device 206 or another suitable location. ML analysis results 226 may provide the ability to display visualizations of the results of the machine learning analysis, including potentially the ability to view spreadsheets, graphs, charts, or other suitable visualizations to facilitate identifying patterns in the values of the service level thresholds 212.

The analysis performed by time series data analysis logic 210 may include a descriptive/explanative component and/or a forecasting component. The descriptive/explanative component may provide an analysis of one or more service level thresholds 212 to understand the relevance of the service level thresholds 212, any inter-connectedness between service level thresholds 212, whether some service level thresholds 212 are adjusted (via the autotuning phase implemented by service level threshold adjustment logic 208) more than others, or the like. The forecasting component may include predictions for values of service level thresholds 212 based on historical trends.

Trained ML model 224 may be retrained, if appropriate. For example, it may be desirable to retrain ML model 224 periodically, which may help maintain and/or improve the performance of ML model 224 at providing relatively accurate predicted patterns. Trained ML model 224 may be retrained using entirely new training data 220, modifications to existing training data 220, modifications to aspects of ML model 224 (e.g., to one or more layers of ML model 224), or any other suitable information.

Service monitoring system 108 may receive instructions 228 that relate to managing service level thresholds 212. Depending on the nature of the instructions 228, instructions 228 may be received by service level threshold analysis engine 114, service level threshold adjustment logic 208, time series data analysis logic 210, or another suitable component of service monitoring system. Instructions 228 may be received from any suitable source, including, for example, from a user. To that end, in certain embodiments, some or all of instructions 228 may reflect manual intervention by a user. The user may include, for example, any suitable combination of a data scientist, a support engineer (e.g., an SRE), a business developer, manager, or any other suitable type of user.

In certain embodiments, instructions 228 may include one or more of a statistical model 214, statistical model data 216 (e.g., parameters for configuring statistical models 214), an instruction to freeze a value of a service level threshold 212, an instruction to unfreeze the value of a service level threshold 212, training data 220, an untrained ML model 222, a trained ML model 224, and/or any other suitable instructions.

In operation of an example embodiment of service monitoring system 108, service level threshold analysis engine 114 (e.g., service level threshold adjustment logic 208) may execute the service metric threshold autotuning phase in the manner described below in connection with FIG. 4. Additionally or alternatively, service level threshold adjustment logic 208 may allow for instructions that freeze/unfreeze service level thresholds 212 in the manner described below in connection with FIG. 5. In operation of an example embodiment of service monitoring system 108, service level threshold analysis engine 114 (e.g., time series data analysis logic 210) may execute the machine learning analysis phase in the manner described below in connection with FIG. 6. The descriptions of FIGS. 3-6 are incorporated into the description of FIG. 2 by reference.

Although functionality and data are shown grouped in a particular manner in FIG. 2, the functionality and/or data may be separated or combined differently, as may be appropriate for a particular implementation. As an example, in certain embodiments, service monitoring system 108 may receive trained ML models 224 from another computer system that handles training of trained ML models 224 using training data 220 and untrained ML models 222. As another example, although illustrated and described separately, service level threshold adjustment logic 208 and time series data analysis logic 210 may be combined, if appropriate. Service monitoring system 108, service level threshold analysis engine 114, service level threshold adjustment logic 208, and time series data analysis logic may be implemented using any suitable combination of hardware, firmware, and software. In certain embodiments, service monitoring system 108 may be implemented using one or more computer systems such as the example described below with reference to FIG. 7.

FIGS. 3-6 illustrate example methods for managing network service level thresholds 212, according to certain embodiments. Although each of these figures is described primarily with respect to a single service metric and the corresponding service level threshold, the method described with reference to each figure may be performed for multiple service metrics and the respective service level thresholds for those service metrics, including concurrently, sequentially, or in another suitable manner. Each of these figures is described below.

Figure 3:
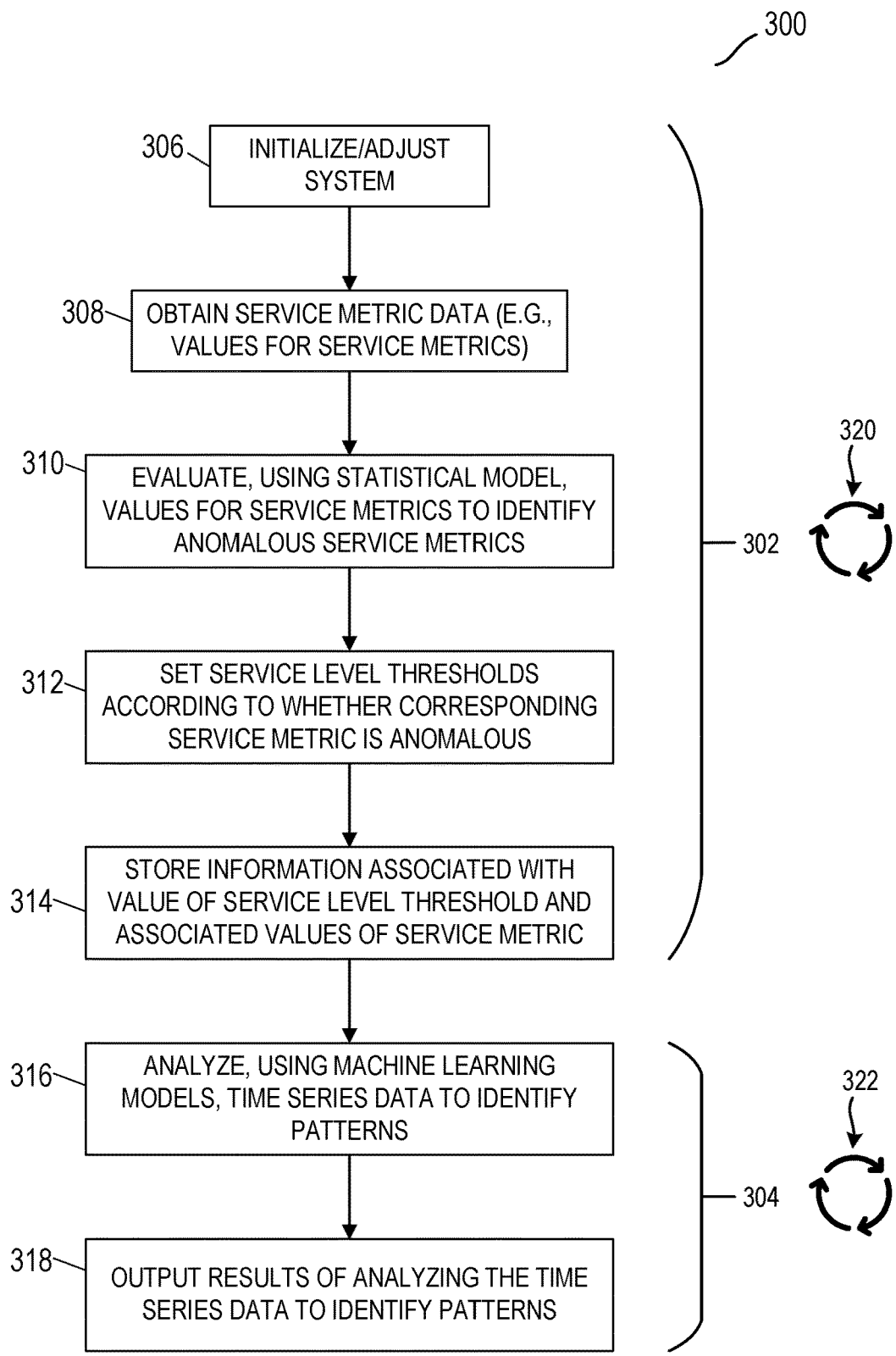
FIG. 3 illustrates an example method for managing service level thresholds, according to certain embodiments.
Figure 4:
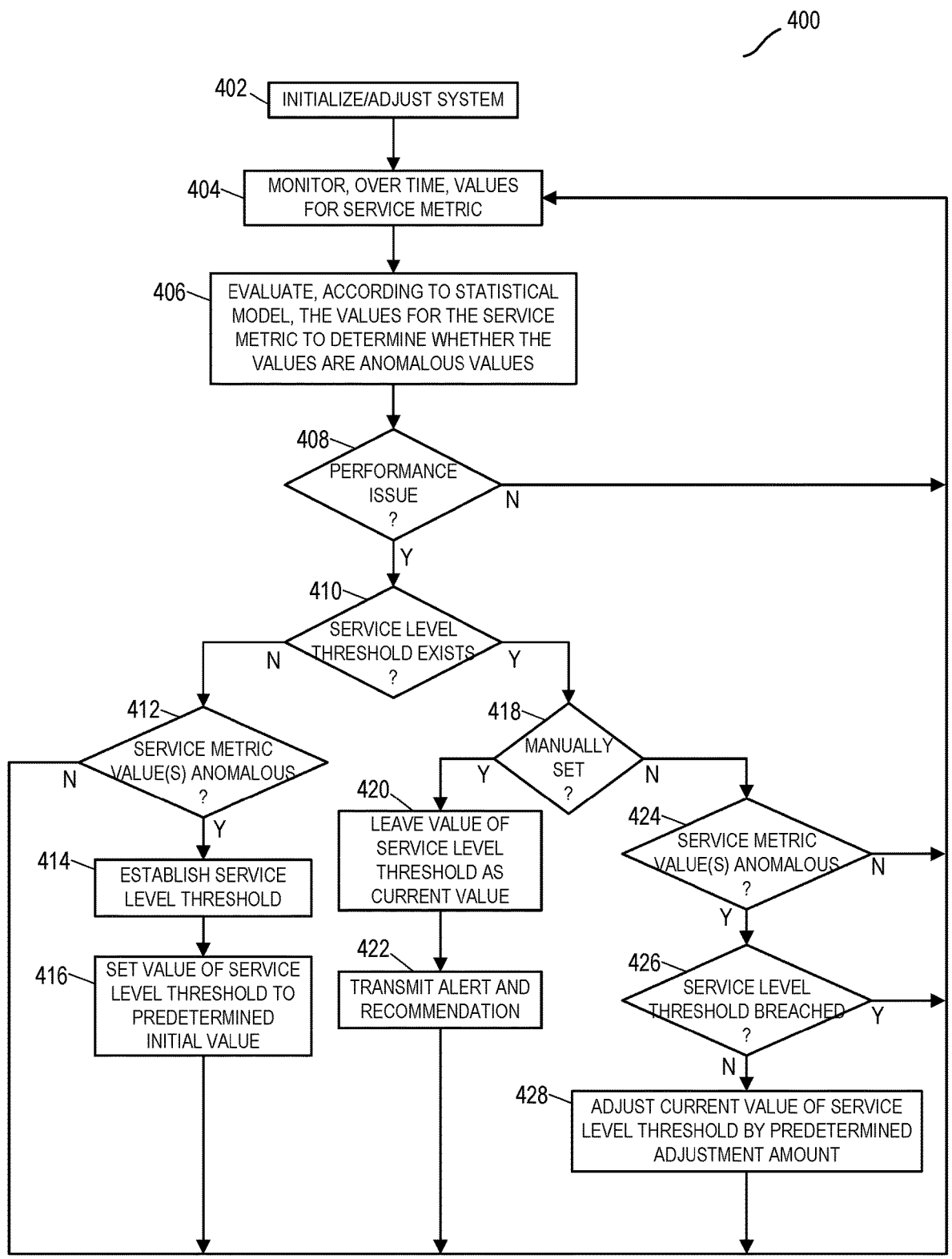
FIG. 4 illustrates an example method for managing service level thresholds, according to certain embodiments.

FIG. 3 illustrates an example method 300 for managing service level thresholds 212, according to certain embodiments. In certain embodiments, some or all of the operations associated with method 300 are performed by service monitoring system 108 or an entity associated with service monitoring system 108.

In the illustrated example, method 300 includes a service level threshold autotuning phase 302 (shown to include steps 306-314) and a machine learning analysis phase 304 (shown to include steps 316-318). During autotuning phase 302, method 300 may include automatically setting (e.g., adjusting) a value of a service level threshold 212 according to an analysis performed using a statistical model 214. During machine learning analysis phase 304, method 300 may include analyzing, using one or more ML models (e.g., trained ML models 224), changes to values for a service level threshold 212 to identify patterns in the changes to the values of the service level threshold 212. Autotuning phase 302 and machine learning analysis phase 304 may run concurrently or at different times, as appropriate.

For ease of description, method 300 is described for a single service metric and a single associated service level threshold 212. It is understood, however, that method 300 may be performed for multiple service metrics, each having an associated service level threshold 212. Method 300 could be executed concurrently, sequentially, or in another manner to manage multiple service level thresholds 212, such as by automatically tuning values for multiple service level thresholds 212 and analyzing results of autotuning values for one or more of the multiple service level thresholds 212 using one or more ML models (e.g., trained ML models 224).

At step 306, service level threshold analysis engine 114 (e.g., service level threshold adjustment logic 208) initializes/adjusts one or more system parameters to prepare for/adjust autotuning phase 302. For example, service level threshold adjustment logic 208 may access configuration information for configuring a statistical model 214. For example, the configuration information may be part of statistical model data 216. In certain embodiments, service level threshold adjustment logic 208 may be stored in and read from a configuration file, such as a yet another markup language (YAML) file. To the extent appropriate, a user (e.g., an SLE) may provide input at step 306, whether to initially configure or tune the system.

In certain embodiments, the configuration information includes the predicted distribution of the service metric values for the service metric; a hypotheses for the service metric, the hypotheses comprising a null hypothesis and an alternative hypothesis; a predetermined initial value (e.g., threshold-edge value) of the service level threshold 212; and a predetermined adjustment amount (e.g., threshold-step value) for the service level threshold 212.

Service level threshold adjustment logic 208 may configure the statistical model 214 according to the configuration information. On a first pass this may include initializing the statistical model 214, and on subsequent passes, this may include adjusting the statistical model 214.

At step 308, service level threshold adjustment logic 208 may obtain service metric data 112 related to services 110. In certain embodiments, service monitoring system 108 obtains service metric data 112 from one or more agents deployed throughout system 100 and/or in any other suitable manner, as described above.

Service metric data 112 may include one or more of service metric values for one or more service metrics, timestamp information, and/or any other suitable information. Service metrics may be parameters that capture aspects of the performance of services 110. For example, service metrics may be considered SLIs. In certain embodiments, service metrics measure aspects of a user's (e.g., a user of client system 102) interaction with service 110 to determine whether the user may be experiencing or about to experience a problem with service 110.

At step 310, service level threshold adjustment logic 208 may evaluate, using a statistical model 214, the values for the service metric to determine whether the values are anomalous values. Statistical model 214 may include a predicted distribution of the values for the service metric and a normal value range within the predicted distribution of the values for the service metric. The predicted distribution of the values for the service metric could be, for example, the so-called normal distribution, a Poisson distribution, or another suitable distribution. The appropriate distribution may be different for different service metrics and/or may vary for a given service metric at different times. Anomalous values may be values for the service metric that fall outside the normal value range.

At step 312, service level threshold adjustment logic 208 may automatically set, in accordance with whether the one or more service metric values for the service metric are anomalous, a value of a service level threshold 212 for the service metric. Setting a service level threshold 212 may vary under different circumstances. For example, if no service level threshold 212 has been established for the service metric, setting service level threshold 212 may include establishing service level threshold 212 (e.g., defining a variable for the service level threshold and setting the service level threshold 212 to an initial value (e.g., threshold_edge value), leaving a current value of the service level threshold 212 unchanged, adjusting the current value of the service level threshold 212 by a predefined adjustment amount (e.g., threshold-step value), or taking another suitable action with respect to the service level threshold 212.

At step 314, service level threshold adjustment logic 208 may store, in a service level threshold adjustment log 218, information associated with the value of the service level threshold 212 and associated values of the service metric. That is, service level threshold adjustment logic 208 may store results of setting the values of service level thresholds 212 for service metrics. For example, service level threshold adjustment logic 208 may store historical values of the service level threshold 212, which may include changes to the value of the service level threshold 212, timing of changes to the service level threshold 212, the circumstances that led to the changes of the service level threshold 212, and/or any other suitable information.

In certain embodiments, service level threshold analysis engine 114 may store results of setting the values of service level thresholds for service metrics as time series data. For example, service level threshold adjustment log 218 may include time series data for values of the service level threshold 212 over time.

At step 316, time series data analysis logic 210 may analyze, using one or more machine learning models (e.g., trained ML models 224), the time series data. The one or more machine learning models (e.g., trained ML models 224) may be trained to identify one or more patterns for the values of the service level thresholds 212. Such patterns may include irregular fluctuations in the values for a service level threshold 212, cyclical patterns in the values for a service level threshold 212, trends in the values for a service level threshold 212, seasonal features in the values for a service level threshold 212, and/or any other suitable patterns.

At step 318, time series data analysis logic 210 may output ML analysis results 226, which may be stored in storage device 206 or another suitable location. ML analysis results 226 may provide the ability to display visualizations of the results of the machine learning analysis, including potentially the ability to view spreadsheets, graphs, charts, or other suitable visualizations to facilitate identifying patterns in the values of the service level thresholds 212.

Although a single iteration of method 300 is described, in certain embodiments, method 300 includes one or more iterative processes that may be repeated at suitable regular or irregular intervals. For example, one or more of phases 302 and 304 may be repeated at regular or irregular intervals, as indicated by iterative symbols 320 and 322, respectively.

FIG. 4 illustrates an example method 400 for managing service level thresholds 212, according to certain embodiments. For example, method 400 may relate to automatically tuning values for a service level threshold, according to certain embodiments. In certain embodiments, some or all of the operations associated with method 400 are performed by service monitoring system 108 or an entity associated with service monitoring system 108. In certain embodiments, method 400 corresponds, at least in part, to autotuning phase 302 of method 300 of FIG. 3.

For ease of description, method 400 is described for a single service metric and a single associated service level threshold 212. It is understood, however, that method 400 may be performed for multiple service metrics, each having an associated service level threshold 212. Method 400 could be executed concurrently, sequentially, or in another manner to manage multiple service level thresholds 212, such as by automatically tuning values for multiple service level thresholds 212.

At step 402, service level threshold analysis engine 114 (e.g., service level threshold adjustment logic 208) initializes/adjusts one or more system parameters to prepare for/adjust autotuning phase 302. For example, service level threshold adjustment logic 208 may access configuration information for configuring a statistical model 214. For example, the configuration information may be part of statistical model data 216. In certain embodiments, service level threshold adjustment logic 208 may be stored in and read from a configuration file, such as a YAML file. To the extent appropriate, a user (e.g., an SRE) may provide input at step 402, whether to initially configure or tune the system.

In certain embodiments, the configuration information includes the predicted distribution of the service metric values for the service metric; a hypotheses for the service metric, the hypotheses comprising a null hypothesis and an alternative hypothesis; a predetermined initial value (e.g., threshold_edge value) of the service level threshold 212; and a predetermined adjustment amount (e.g., threshold-step value) for the service level threshold 212.

Service level threshold adjustment logic 208 may configure the statistical model 214 according to the configuration information. On a first pass this may include initializing the statistical model 214, and on subsequent passes, this may include adjusting the statistical model 214.

At step 404, service level threshold adjustment logic 208 may monitor, over time, values for a service metric related to services 110. For example, service level threshold adjustment logic 208 may obtain service metric data 112 related to services 110. In certain embodiments, service monitoring system 108 obtains service metric data 112 from one or more agents deployed throughout system 100 and/or in any other suitable manner, as described above.

Service metric data 112 may include one or more of service metric values for one or more service metrics, timestamp information, and/or any other suitable information. Service metrics may be parameters that capture aspects of the performance of services 110. For example, service metrics may be considered SLIs. In certain embodiments, service metrics measure aspects of a user's (e.g., a user of client system 102) interaction with service 110 to determine whether the user may be experiencing or about to experience a problem with service 110.

At step 406, service level threshold adjustment logic 208 may evaluate, using a statistical model 214, the values for the service metric to determine whether the values are anomalous values. Statistical model 214 may include a predicted distribution of the values for the service metric and a normal value range within the predicted distribution of the values for the service metric. The predicted distribution of the values for the service metric could be, for example, the so-called normal distribution, a Poisson distribution, or another suitable distribution. The appropriate distribution may be different for different service metrics and/or may vary for a given service metric at different times. Anomalous values may be values for the service metric that fall outside the normal value range.

Example implementation details of statistical model 214 and statistical model data 216 are described above in connection with FIG. 2 and are incorporated by reference.

At step 408, service level threshold adjustment logic 208 may determine whether a performance issue for service 110 has been detected. On other words, service level threshold adjustment logic 208 may determine whether service 110 is having a performance issue. In certain embodiments, a service having a performance issue may include one or more of the following: one or more service level thresholds 212 for the service 110 being breached by one or more values of a corresponding service metric; a user of client system 102 identifying an issue (e.g., a customer support request from a user of client system 102); or a user (e.g., an SRE) associated with service provider system 104 indicating an issue. As to breaching of one or more service level thresholds 212, in certain embodiments, service level threshold adjustment logic 208 determines whether one or more service level thresholds 212 for the service 110 are breached by one or more values of a corresponding service metric. Additionally or alternatively, another component of system 100 may determine whether one or more service level thresholds 212 for the service 110 are breached by one or more values of a corresponding service metric and report breaches to service level threshold adjustment logic 208.

Step 408 might or might not be an explicit determination. For example, in certain embodiments, service level threshold adjustment logic 208 may simply detect that service 110 is having a performance issue, such as in response to a notification from another component (e.g., a component evaluating whether values for service metrics breach corresponding service level thresholds) or user input.

If service level threshold adjustment logic 208 detects that service 110 does not have a performance at step 408 (or simply does not detect that service 110 has a performance issue), then method 400 may return to step 404 to continue to monitor values for the service metric. If appropriate, method 400 could return to step 402 to adjust one or more system parameters or perform other suitable configuration/adjustment operations.

If service level threshold adjustment logic 208 detects that service 110 has a performance issue at step 408, then at step 410, service level threshold adjustment logic 208 may determine whether a service level threshold 212 exists for the service metric. For example, storage module 206 may store a record of which service metrics have a corresponding service level threshold, including potentially a mapping of service level thresholds to service metrics, which may be implemented in any suitable manner. In an example in which values for multiple service metrics are being monitored, service level threshold adjustment logic 208 may perform a similar operation (and subsequent operations) for each service metric.

If service level threshold adjustment logic 208 determines at step 410 that a service level threshold 212 does not exist for the service metric, then service level threshold adjustment logic 208 may determine at step 412 whether one or more service metric values for the service metric are anomalous. For example, based on the evaluation performed at step 406, service level threshold adjustment logic 208 may determine whether one or more service metric values for the service metric are anomalous.

In certain embodiments, the one or more values for the service metric are correlated in time to a time associated with the performance issue. For example, the performance issue detected at step 408 may be associated with a time (e.g., a particular time or time frame). In certain embodiments, to determine whether one or more service metric values for the service metric are anomalous, service level threshold adjustment logic 208 may consider one or more values for the service metric that reflect a measurement at the same or about the same time as the time of the performance issue. The particular amount of correlation can vary according to particular implementations. For example, the performance issue and the one or more values for the service metric could have a same time, an overlapping time, a time proximate within a specified range (e.g., +n seconds before or after the time of the performance issue, n being a predefined value), or another suitable relationship.

If service level threshold adjustment logic 208 determines at step 412 that no (or insufficient) service metric values for the service metric are anomalous, then method 400 may return to step 404 to continue to monitor values for the service metric. For example, service level threshold adjustment logic 208 may determine that no (or insufficient) service metric values for the service metric that correlate in time to the detected performance issue (of step 408) are identified. If appropriate, method 400 could return to step 402 to adjust one or more system parameters or perform other suitable configuration/adjustment operations.

If service level threshold adjustment logic 208 determines at step 412 that one or more service metric values for the service metric are anomalous, then method 400 may proceed to step 414. For example, service level threshold adjustment logic 208 may determine that one or more service metric values for the service metric that correlate in time to the detected performance issue (of step 408) are identified. At step 414, service level threshold adjustment logic 208 may establish a service level threshold 212 for the service metric. For example, service level threshold adjustment logic 208 may define in storage module 206 appropriate variables and other information to define a service level threshold for the service metric. At step 416, service level threshold adjustment logic 208 may assign an initial value to the service level threshold established at step 414. In certain embodiments, the initial value is a predefine value, which in one example may be represented as the value threshold_edge.

Thus, in certain embodiments of method 400, automatically setting, in accordance with whether the one or more values for the service metric are anomalous (e.g., steps 406 and 412), the value of the service level threshold 212 for the service metric includes automatically, in response to determining that the one or more values for the service metric are anomalous (e.g., step 412) and in response to determining that a service level threshold for the service metric does not exist (e.g., step 410), establishing the service level threshold 212 for the service metric (e.g., step 414) and setting the value of the service level threshold 212 to a predetermined initial value (e.g., step 416).

Method 400 then may return to step 404 to continue to monitor values for the service metric. If appropriate, method 400 could return to step 402 to adjust one or more system parameters or perform other suitable configuration/adjustment operations.

Returning to step 410, if service level threshold adjustment logic 208 determines at step 410 that a service level threshold 212 exists for the service metric, then at step 418, service level threshold adjustment logic 208 may determine whether the current value of the service level threshold 212 was manually set. In certain embodiments, statistical model data 216 (or another suitable element of service monitoring system 108) includes a flag for indicating whether or not a current value of the service level threshold 212 is set manually. For example, the flag could be a Boolean value indicating either that the current value of the service level threshold 212 was or was not set manually. Service level threshold adjustment logic 208 may access the current value of this flag to determine, at step 418, whether the current value of the service level threshold 212 was manually set.

If service level threshold adjustment logic 208 determines at step 418 that the current value of the service level threshold 212 was manually set, then at step 420 service level threshold adjustment logic 208 may leave the value of the service level threshold 212 as the current value of the service level threshold 212. At step 422, service level threshold adjustment logic 208 may transmit an alert and recommendation for an updated value for the service level threshold (e.g., to a user, such as an SRE, of service provider system 104). If desired, the user or another suitable entity may manually update the value of the service level threshold 212 to the recommended value or another value. Method 400 may return to step 404 to continue to monitor values for the service metric. If appropriate, method 400 could return to step 402 to adjust one or more system parameters or perform other suitable configuration/adjustment operations.

Thus, in certain embodiments, method 400 includes determining whether a service level threshold 212 for the service metric exists (e.g., step 410) and determining whether a current value of the service level threshold 212 was set manually (e.g., step 418), and automatically setting, in accordance with whether the one or more values for the service metric are anomalous (e.g., steps 406 and 424), the value of the service level threshold 212 for the service metric includes, in response to determining that a service level threshold 212 for the service metric exists (e.g., step 410) and that the current value of the service level threshold 212 was set manually (e.g., step 418)), automatically leaving the value of the service level threshold 212 as the current value of the service level threshold 212 (e.g., step 420) and transmitting an alert that comprises a proposed new value for the service level threshold 212 (e.g., step 422).

Returning to step 418, if service level threshold adjustment logic 208 determines at step 418 that the current value of the service level threshold 212 was not manually set, then service level threshold adjustment logic 208 may determine at step 424 whether one or more service metric values for the service metric are anomalous. For example, based on the evaluation performed at step 406, service level threshold adjustment logic 208 may determine whether one or more service metric values for the service metric are anomalous.

As described above with reference to step 412, in certain embodiments, the one or more values for the service metric are correlated in time to a time associated with the performance issue. The description associated with step 412 is incorporated by reference.

If service level threshold adjustment logic 208 determines at step 424 that no (or insufficient) service metric values for the service metric are anomalous, then method 400 may return to step 404 to continue to monitor values for the service metric. For example, service level threshold adjustment logic 208 may determine that no (or insufficient) service metric values for the service metric that correlate in time to the detected performance issue (of step 408) are identified. If appropriate, method 400 could return to step 402 to adjust one or more system parameters or perform other suitable configuration/adjustment operations.

Thus, in certain embodiments, method 400 includes determining whether a service level threshold 212 for the service metric exists (e.g., step 410), and automatically setting, in accordance with whether the one or more values for the service metric are anomalous (e.g., steps 406 and 424), the value of the service level threshold 212 for the service metric includes automatically leaving, in response to determining that the one or more values for the service metric are not anomalous (e.g., step 424) (and potentially further in response to a determination that the current value of the service level threshold 212 was not set manually (e.g., step 418)), the value of the service level threshold 212 as the current value of the service level threshold 212 (e.g., step 424 returning to step 404 following an "N" decision).

If service level threshold adjustment logic 208 determines at step 424 that one or more service metric values for the service metric are anomalous, then method 400 may proceed to step 426. For example, service level threshold adjustment logic 208 may determine that one or more service metric values for the service metric that correlate in time to the detected performance issue (of step 408) are identified.

At step 426, service level threshold adjustment logic 208 may determine whether the one or more service metric values for the service metric breach the current value of the service level threshold. Service level threshold adjustment logic 208 may determine whether the one service metric values for the service metric breach the current value of the service level threshold for that service metric in any suitable manner. For example, service level threshold adjustment logic 208 may compare individual service metric values, multiple service metric values (e.g., over a particular period of time and/or a particular number of service metric values), or a value (e.g., an average) of multiple service metric values to the current value of the service level threshold for that service metric to determine whether the service metric values for the service metric breach the service level threshold for that service metric. As another example, the one or more service metric values for a service metric breaching a current value of the service level threshold for that service metric may include the one or more service metric values exceeding (e.g., being greater than, or greater than or equal to, depending on the implementation) the current value of the service level threshold, the one or more service metric values falling below (e.g., being less than, or less than or equal to, depending on the implementation) the current value of the service level threshold, or any other suitable implementation.

In certain embodiments, service level threshold adjustment logic 208 determines whether the one or more service level thresholds 212 for the service 110 are breached by one or more values of a corresponding service metric. Additionally or alternatively, another component of system 100 may determine whether one or more service level thresholds 212 for the service 110 are breached by one or more values of a corresponding service metric and report breaches to service level threshold adjustment logic 208.

If service level threshold adjustment logic 208 determines at step 426 that the one or more service metric values for the service metric breach the service level threshold 212, then method 400 may return to step 404 to continue to monitor values for the service metric. If appropriate, method 400 could return to step 402 to adjust one or more system parameters or perform other suitable configuration/adjustment operations.

If service level threshold adjustment logic 208 determines at step 426 that the one or more service metric values for the service metric do not breach the current value of the service level threshold 212, then at step 428 service level threshold adjustment logic 208 may adjust the current value of the service level threshold 212 by a predetermined adjustment amount (e.g., threshold-step value) for the service level threshold 212.

Thus, in certain embodiments, method 400 includes determining whether a service level threshold 212 for the service metric exists (e.g., step 410) and determining whether one or more values for the service metric breach a current value of the service level threshold 212 (e.g., step 426), and automatically setting, in accordance with whether the one or more values for the service metric are anomalous (e.g., steps 406 and 424), the value of the service level threshold 212 for the service metric includes automatically adjusting, in response to determining that the one or more values for the service metric are anomalous (e.g., step 424), that a service level threshold 212 for the service metric exists (e.g., step 410), and that the one or more values for the service metric do not breach the current value of the service level threshold 212 (e.g., step 426), the current value of the service level threshold 212 by a predetermined adjustment amount (e.g., step 428).

Method 400 then may return to step 404 to continue to monitor values for the service metric. If appropriate, method 400 could return to step 402 to adjust one or more system parameters or perform other suitable configuration/adjustment operations.

In certain embodiments, some or all of steps 408-428 may be considered part of or otherwise associated with automatically setting, in accordance with whether the one or more values for the service metric are anomalous (and potentially other combinations of factors), a value of a service level threshold for the service metric. As described above, setting a service level threshold may include establishing the service level threshold (e.g., step 414) and setting the service level threshold to an initial value (e.g., step 416), leaving a current value of the service level threshold unchanged (e.g., step 420 and following an "N" decision at step 424), adjusting the current value of the service level threshold by a predefined adjustment amount (e.g., step 428), or taking another suitable action with respect to the service level threshold.

As described above, in certain embodiments, method 400 may be performed for multiple service metrics, each having an associated service level threshold 212. In certain implementations of such an example, in response to determining at step 408 that service 110 is experiencing performance issues, service level threshold adjustment logic 208 may review multiple and potentially all service metrics (e.g., the service metric values for those service metrics) for anomalous values to determine whether to adjust the corresponding service level thresholds 212. In other words, in certain embodiments, in response to determining at step 410 that service 110 is experiencing performance issues, for multiple and potentially all service metrics, service level threshold adjustment logic 208 may perform appropriate ones of steps 412 through 428 to determine how to set the corresponding service level thresholds 212 for those service metrics.

Although in certain embodiments method 400 is capable of operating substantially autonomously to autotune the values of one or more service level thresholds 212, in certain embodiments, a user, such as an SRE or other suitable user, may provide manual input at any point during method 400. For example, a user may provide one or more instructions 228 to service monitoring system (e.g., to service threshold analysis engine 114/service level threshold adjustment logic 208).

As discussed above with reference to method 300 of FIG. 3, in certain embodiments, service level threshold adjustment logic 208 may store, in a service level threshold adjustment log 218, information associated with the value of the service level threshold 212 and associated values of the service metric. That is, service level threshold adjustment logic 208 may store results of setting the values of service level thresholds 212 for service metrics. For example, service level threshold adjustment logic 208 may store historical values of the service level threshold 212, which may include changes to the value of the service level threshold 212, timing of changes to the service level threshold 212, the circumstances that led to the changes of the service level threshold 212, and/or any other suitable information.

Figure 5:
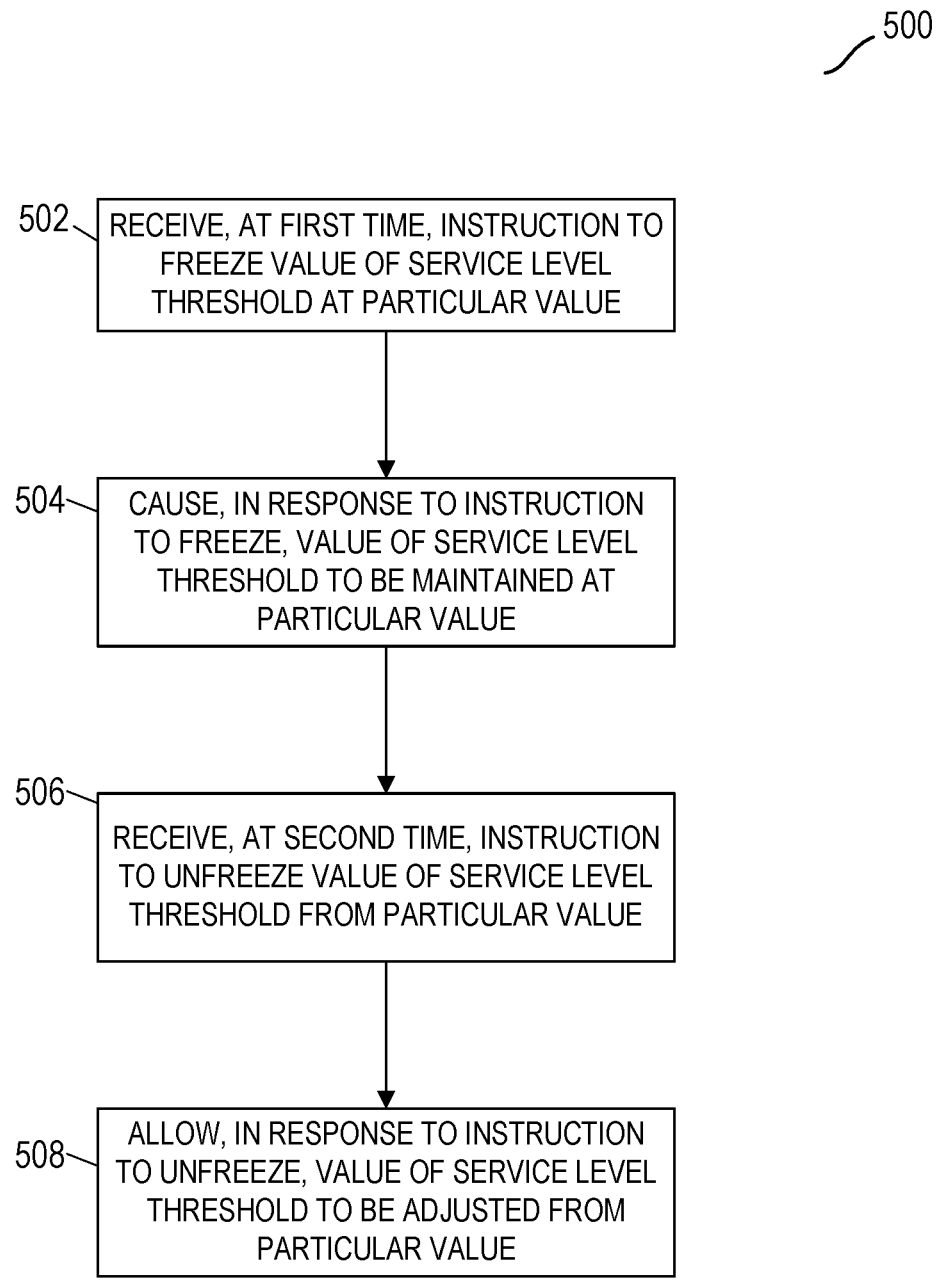
FIG. 5 illustrates an example method for freezing and unfreezing a value of a service level threshold, according to certain embodiments.

FIG. 5 illustrates an example method 500 for freezing and unfreezing a value of a service level threshold 212, according to certain embodiments. In certain embodiments, some or all of the operations associated with method 500 are performed by service monitoring system 108 or an entity associated with service monitoring system 108. In certain embodiments, method 500 may be performed during autotuning phase 302 of method 300 of FIG. 3.

For ease of description, method 500 is described for a single service metric and a single associated service level threshold 212. It is understood, however, that method 500 may be performed for multiple service metrics, each having an associated service level threshold 212. Method 500 could be executed concurrently, sequentially, or in another manner to manage multiple service level thresholds 212, such as by freezing and/or unfreezing values for multiple service level thresholds 212. Whether freezing/unfreezing values for one or multiple service level thresholds 212, in certain embodiments, values for one or more other service level thresholds 212 may continue to be autotuned by service level threshold adjustment logic 208, if appropriate.

At step 502, service level threshold analysis engine 114 (e.g., service level threshold adjustment logic 208) may receive, at a first time, an instruction to freeze the value of a service level threshold 212 at a particular value. The particular value may be a current value of the service level threshold 212 or another suitable value. In certain embodiments, the instruction to freeze the value of the service level threshold 212 is received from a user, such as an SRE or other suitable user.

At step 504, service level threshold adjustment logic 208 may cause, in response to the instruction to freeze the value of the service level threshold 212 at a particular value, the value of the service level threshold 212 to be maintained at the particular value. In certain embodiments, statistical model data 216 includes a flag for indicating whether or not a current value of the service level threshold 212 is set manually, and service level threshold adjustment logic 208 may set, in response to the instruction to freeze the value of the service level threshold 212 at a particular value, the value of the flag to indicate that the value of the service level threshold 212 has been set manually.

At step 506, service level threshold adjustment logic 208 may receive, at a second time, an instruction to unfreeze the value of the service level threshold 212 from the particular value. In certain embodiments, the instruction to unfreeze the value of the service level threshold 212 is received from a user, such as an SRE or other suitable user. Additionally or alternatively, a time period may be specified with the instruction to freeze received at step 502, and service level threshold adjustment logic 208 may set a timer according to that time period when freezing the value of the service level threshold 212. In such an embodiment, expiration of the timer may be considered an instruction received, at a second time, to unfreeze the value of the service level threshold 212 from the particular value.

At step 508, service level threshold adjustment logic 208 may allow, in response to the instruction to unfreeze the value of the service level threshold 212 from the particular value, the value of the service level threshold 212 to be adjusted from the particular value. For example, service level threshold adjustment logic 208 may resume autotuning of the value of the service level threshold 212. To the extent statistical model data 216 includes a flag for indicating whether or not a current value of the service level threshold 212 is set manually, in certain embodiments, service level threshold adjustment logic 208 may set, in response to the instruction to unfreeze the value of the service level threshold 212 from the particular value, the value of the flag to indicate that the value of the service level threshold 212 is not set manually.

Although a single iteration of method 500 is described, in certain embodiments, method 500 may be initiated at any suitable time or times during autotuning phase 302.

Figure 6:
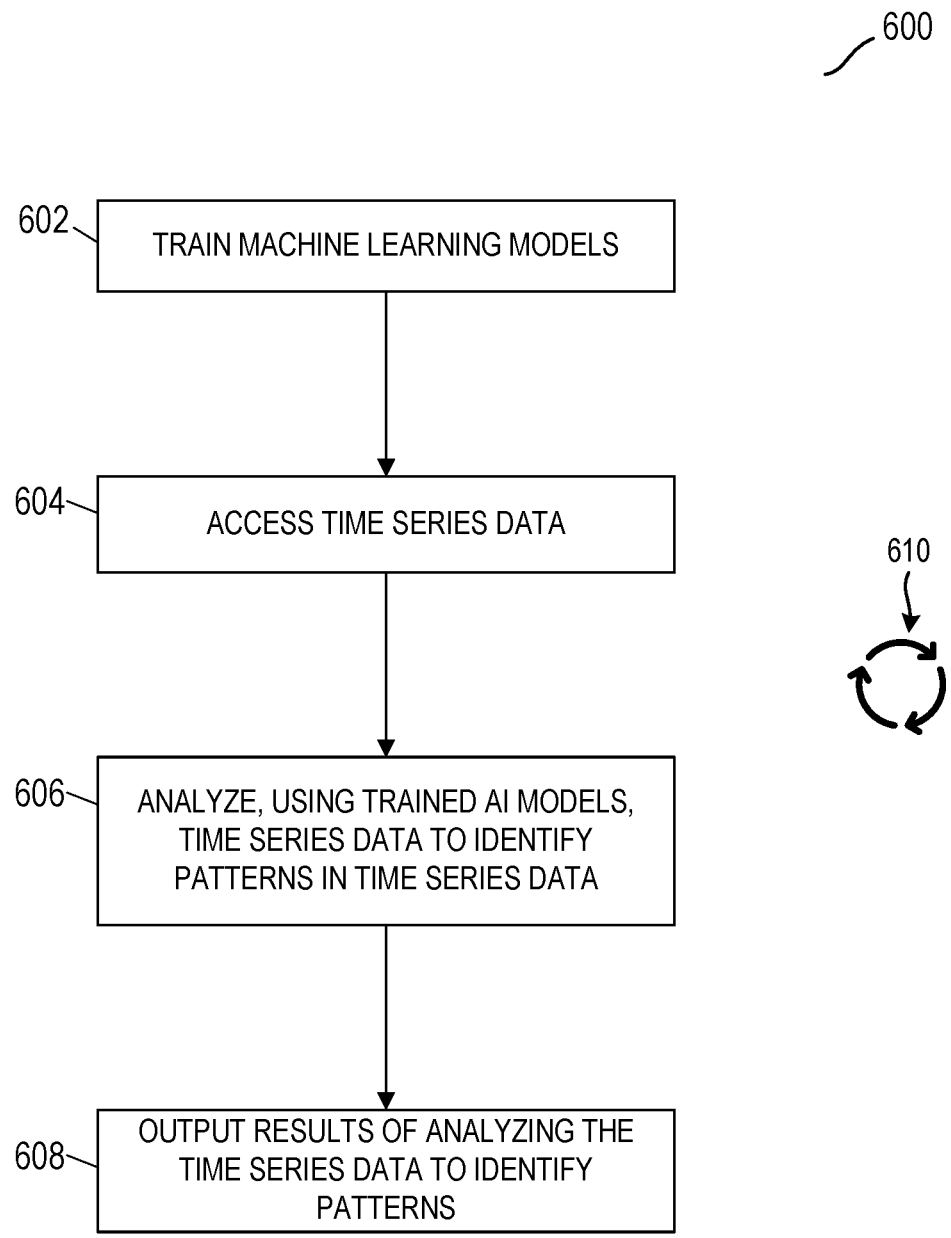
FIG. 6 illustrates an example method for managing service level thresholds, according to certain embodiments.

FIG. 6 illustrates an example method 600 for managing service level thresholds 212, according to certain embodiments. For example, method 600 may relate to analyzing, using one or more machine learning models, changes to values for a service level threshold 212 to identify patterns in the changes to the values of the service level threshold 212, according to certain embodiments. In certain embodiments, some or all of the operations associated with method 600 are performed by service monitoring system 108 or an entity associated with service monitoring system 108. In certain embodiments, method 600 corresponds, at least in part, to machine learning analysis phase 304 of method 300 of FIG. 3.

For ease of description, method 600 is described for a single service metric and a single associated service level threshold 212. It is understood, however, that method 600 may be performed for multiple service metrics, each having an associated service level threshold 212. Method 600 could be executed concurrently, sequentially, or in another manner to manage multiple service level thresholds 212, such as by automatically analyzing results of autotuning values for one or more of the multiple service level thresholds 212 using one or more ML models (e.g., trained ML models 224).

At step 602, time series data analysis logic 210 may train one or more machine learning models. For example, one or more untrained ML models 222 and/or one or more trained ML models 224 may be retrained. For example, whether training an untrained ML model 22 or retraining a trained ML model 224, the one or more machine learning models may be trained using training data 220.

Although the training of the one or more machine learning models is described as being performed by time series data analysis logic 210, the training of some or all of the one or more machine learning models may be performed by another module of service monitoring system 108, or may be performed by another processing system distinct from service monitoring system 108 and loaded onto service monitoring system 108 (e.g., into storage device 206) or otherwise made accessible to time series data analysis logic 210 as trained ML models 224.

At step 604, time series data analysis logic 210 may access time series data. As described above, service level threshold adjustment logs 218 may include time series data for values of the service level thresholds 212 over time. In certain embodiments, time series data analysis logic 210 may access the time series data that is part of service level threshold adjustment logs 218.

At step 606, time series data analysis logic 210 may analyze, using one or more machine learning models (e.g., trained ML models 224), the time series data. The one or more machine learning models (e.g., trained ML models 224) may be trained to identify one or more patterns for the values of the service level thresholds 212. Such patterns may include irregular fluctuations in the values for a service level threshold 212, cyclical patterns in the values for a service level threshold 212, trends in the values for a service level threshold 212, seasonal features in the values for a service level threshold 212, and/or any other suitable patterns.

At step 608, time series data analysis logic 210 may output ML analysis results 226, which may be stored in storage device 206 or another suitable location. ML analysis results 226 may provide the ability to display visualizations of the results of the machine learning analysis, including potentially the ability to view spreadsheets, graphs, charts, or other suitable visualizations to facilitate identifying patterns in the values of the service level thresholds 212.

Although in certain embodiments method 600 is capable of operating substantially autonomously to analyze, using one or more machine learning models, changes to values for a service level threshold 212 to identify patterns in the changes to the values of the service level threshold 212, in certain embodiments, a user, such as an SRE or other suitable user, may provide manual input at any point during method 600. For example, a user may provide one or more instructions 228 to service monitoring system (e.g., to service threshold analysis engine 114/time series data analysis logic 210).

Although a single iteration of method 600 is described, in certain embodiments, method 600 includes one or more iterative processes that may be repeated at suitable regular or irregular intervals, as indicated by iterative symbol 610.

Methods 300, 400, 500, and 600 may be combined and performed using the systems and apparatuses described herein. Although shown in a logical order, the arrangement and numbering of the steps of methods 300, 400, 500, and 600 are not intended to be limited. The steps of methods 300, 400, 500, and 600 may be performed in any suitable order or concurrently with one another as may be apparent to a person of skill in the art.

Figure 7:
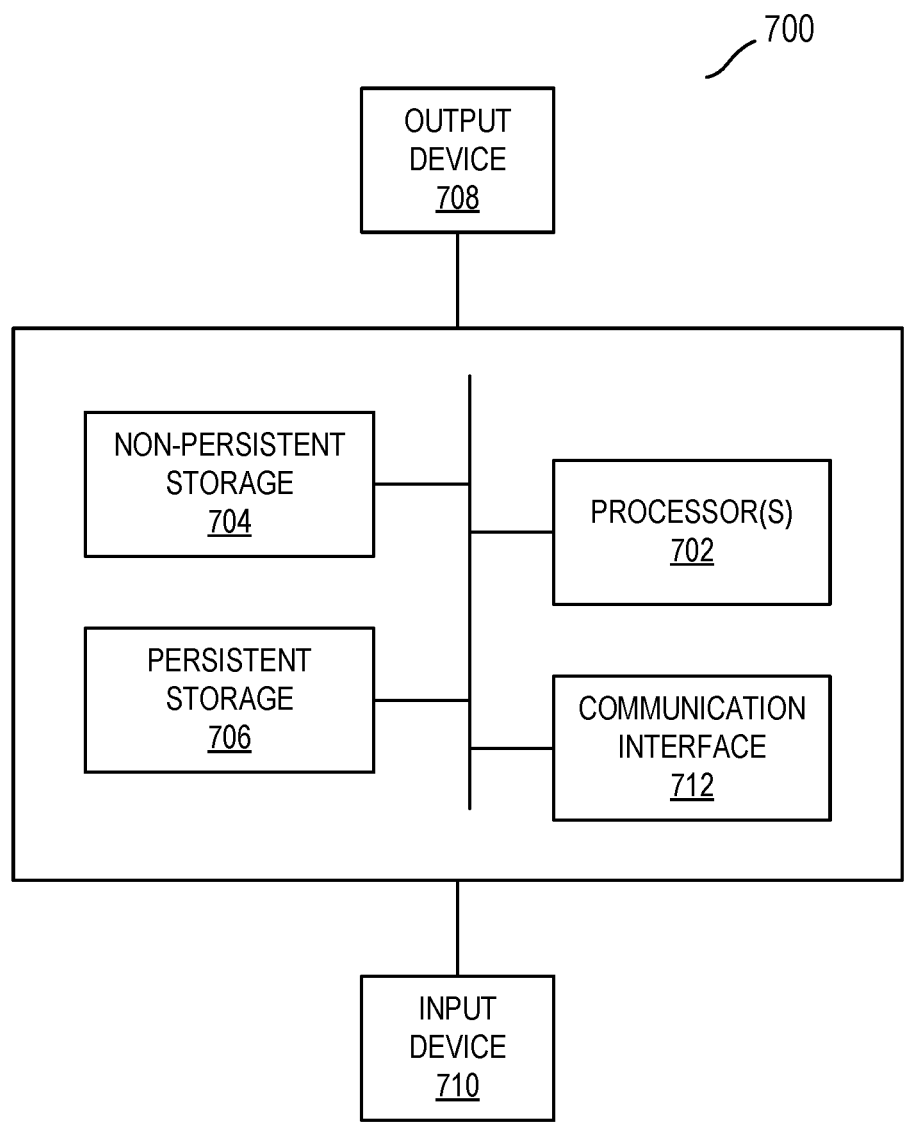
FIG. 7 illustrates a block diagram of an example computing device, according to certain embodiments.

FIG. 7 illustrates a block diagram of an example computing device 700, according to certain embodiments. As discussed above, embodiments of this disclosure may be implemented using computing devices. For example, all or any portion of the components shown in FIGS. 1-2 (e.g., client system 102, service provider system 104, and service monitoring system (including, if applicable, service level threshold adjustment logic 208 and/or time series data analysis logic 210 and their associated storage devices 206) may be implemented, at least in part, using one or more computing devices. As another example, all or any portion of the methods shown in FIGS. 3-6 may be implemented, at least in part, using one or more computing devices such as computing device 700.

Computing device 700 may include one or more computer processors 702, non-persistent storage 704 (e.g., volatile memory, such as random access memory (RAM), cache memory, etc.), persistent storage 706 (e.g., a hard disk, an optical drive such as a compact disk (CD) drive or digital versatile disk (DVD) drive, a flash memory, etc.), a communication interface 712 (e.g., Bluetooth interface, infrared interface, network interface, optical interface, etc.), input devices 710, output devices 708, and numerous other elements and functionalities. Each of these components is described below.

In certain embodiments, computer processor(s) 702 may be an integrated circuit for processing instructions. For example, computer processor(s) may be one or more cores or micro-cores of a processor. Processor 702 may be a general-purpose processor configured to execute program code included in software executing on computing device 700. Processor 702 may be a special purpose processor where certain instructions are incorporated into the processor design. Although only one processor 702 is shown in FIG. 7, computing device 700 may include any number of processors.

Computing device 700 may also include one or more input devices 710, such as a touchscreen, keyboard, mouse, microphone, touchpad, electronic pen, motion sensor, or any other type of input device. Input devices 710 may allow a user to interact with computing device 700. In certain embodiments, computing device 700 may include one or more output devices 708, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) 702, non-persistent storage 704, and persistent storage 706. Many different types of computing devices exist, and the aforementioned input and output device(s) may take other forms. In some instances, multimodal systems can allow a user to provide multiple types of input/output to communicate with computing device 700.

Further, communication interface 712 may facilitate connecting computing device 700 to a network (e.g., a LAN, WAN) such as the Internet, mobile network, or any other type of network) and/or to another device, such as another computing device. Communication interface 712 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a Bluetooth® Low Energy (BLE) wireless signal transfer, an IBEACON® wireless signal transfer, an RFID wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 712 may also include one or more Global Navigation Satellite System (GNSS) receivers or transceivers that are used to determine a location of the computing device 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of computing device 700 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Certain embodiments may provide none, some, or all of the following technical advantages. These and other potential technical advantages may be described elsewhere in this disclosure, or may otherwise be readily apparent to those skilled in the art based on this disclosure.

Certain embodiments may provide for improved values of service level thresholds, which may improve overall system performance. Rather than solely relying on the possibly sporadic manual intervention of SREs or other users to modify service level thresholds, certain embodiments are able to automatically tune values for service level thresholds based on statistical models that provide more reliable and up-to-date information than may be possible with manual user intervention.

In certain embodiments, by autotuning values for one or more service level thresholds, the burden on SRE or other users to manually set service level thresholds (e.g., SLOs) for service metrics (e.g., SLIs) may be reduced or eliminated. This may be particularly useful for service metrics whose impact on the end customer experience is currently uncertain.

Certain embodiments may provide traceability of changes to service level thresholds, such as by maintaining logs of changes to values for service level thresholds.

Certain embodiments may allow values for one or more service level thresholds to "float" during specific tests designed to provoke poor service behaviour, and for the values of those one or more service level thresholds to thereby be set via system testing (e.g., via the autotuning mechanism).

Certain embodiments may allow SRE engineers or other users to concentrate on a specific subset of vital service level thresholds for manual intervention and let the system set and adjust (via the automated autotuning mechanism) other service level thresholds.

Certain embodiments may allow service level thresholds to be frozen manually if desired at any point.

Certain embodiments may provide time series analysis on of values for service level thresholds, as adjusted using the autotuning mechanism, which may provide insights and/or predictions.

It should be understood that the systems and methods described in this disclosure may be combined in any suitable manner.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A computer system, comprising:
   one or more processors; and
   one or more non-transitory computer-readable storage media storing programming for execution by the one or more processors, the programming comprising instructions to:
   monitor, over time, values for a service metric associated providing a computerized service over a communication network;
   evaluate, according to a statistical model, the values for the service metric to determine whether the values are anomalous values, the statistical model comprising a predicted distribution of the values for the service metric and a normal value range within the predicted distribution of the values for the service metric, anomalous values being values for the service metric outside the normal value range;
   detect a performance issue with the computerized service;
   determine, in response to detecting the performance issue with the computerized service, whether one or more of the values for the service metric are anomalous;
   automatically set, in accordance with whether the one or more values for the service metric are anomalous, a value of a service level threshold for the service metric;
   determine whether a service level threshold for the service metric exists;
   automatically set, in accordance with whether the one or more values for the service metric are anomalous, the value of the service level threshold for the service metric comprise instructions to automatically, in response to determining that the one or more values for the service metric are anomalous and in response to determining that a service level threshold for the service metric does not exist:
     establish the service level threshold for the service metric; and
     set the value of the service level threshold to a predetermined initial value.

2. The computer system of claim 1, wherein:
   the programming further comprises instructions to determine whether the values for the service metric breach a current value of the service level threshold; and
   the instructions to detect the performance issue with the computerized service comprise instructions to determine that a particular value of the values for the service metric breach the current value of the service level threshold.

3. The computer system of claim 1, wherein the one or more values for the service metric are correlated in time to a time associated with the performance issue.

4. The computer system of claim 1, wherein the instructions to automatically set, in accordance with whether the one or more values for the service metric are anomalous, the value of the service level threshold for the service metric comprise at least one of:
   instructions to set an initial value of the service level threshold to a predetermined initial value; or
   instructions to adjust a current value of the service level threshold by a predetermined adjustment amount.

5. The computer system of claim 1, wherein:
   the programming further comprises instructions to:
     determine whether a service level threshold for the service metric exists; and
     determine whether one or more values for the service metric breach a current value of the service level threshold; and
   the instructions to automatically set, in accordance with whether the one or more values for the service metric are anomalous, the value of the service level threshold for the service metric comprise instructions to automatically adjust, in response to determining that the one or more values for the service metric are anomalous, that a service level threshold for the service metric exists, and that the one or more values for the service metric do not breach the current value of the service level threshold, the current value of the service level threshold by a predetermined adjustment amount.

6. The computer system of claim 1, wherein:
   the programming further comprises instructions to determine whether a service level threshold for the service metric exists; and
   the instructions to automatically set, in accordance with whether the one or more values for the service metric are anomalous, the value of the service level threshold for the service metric comprise instructions to automatically leave, in response to determining that the one or more values for the service metric are not anomalous and that a service level threshold for the service metric exists, the value of the service level threshold as a current value of the service level threshold.

7. The computer system of claim 1, wherein:
   the programming further comprises instructions to:
     determine whether a service level threshold for the service metric exists; and
     determine whether a current value of the service level threshold was set manually;
   the instructions to automatically set, in accordance with whether the one or more values for the service metric are anomalous, the value of the service level threshold for the service metric comprise instructions to automatically leave, in response to determining that a service level threshold for the service metric exists and that the current value of the service level threshold was set manually, the value of the service level threshold as a current value of the service level threshold; and
   the programming further comprises instructions to transmit, in response to determining that the current value of the service level threshold was set manually, an alert that comprises a proposed new value for the service level threshold.

8. The computer system of claim 1, wherein the programming further comprises instructions to store, in a service level threshold adjustment log, information associated with the value of the service level threshold and associated values of the service metric.

9. The computer system of claim 8, wherein:
   wherein the service level threshold adjustment log comprises time series data for values of the service level threshold over time; and the programming further comprises instructions to analyze, using one or more machine learning models, the time series data, wherein the one or more machine learning models are trained to identify one or more patterns for the values of the service level threshold.

10. The computer system of claim 1, wherein the programming further comprises instructions to:
   receive, at a first time, an instruction to freeze the value of the service level threshold at a particular value;
   cause, in response to the instruction to freeze the value of the service level threshold at a particular value, the value of the service level threshold to be maintained at the particular value;
   receive, at a second time, an instruction to unfreeze the value of the service level threshold from the particular value; and
   allow, in response to the instruction to unfreeze the value of the service level threshold from the particular value, the value of the service level threshold to be adjusted from the particular value.

11. The computer system of claim 1, wherein the programming further comprises instructions to:
   access configuration information for configuring the statistical model, the configuration information comprising:
      the predicted distribution of the values for the service metric;
      a hypotheses for the service metric, the hypotheses comprising a null hypothesis and an alternative hypothesis;
      a predetermined initial value of the service level threshold; and
      a predetermined adjustment amount for the service level threshold; and
   configure the statistical model according to the configuration information.

12. A computer-implemented method, comprising:
   monitoring, over time, values for a service metric associated providing a computerized service over a communication network;
   evaluating, according to a statistical model, the values for the service metric to determine whether the values are anomalous values, the statistical model comprising a predicted distribution of the values for the service metric and a normal value range within the predicted distribution of the values for the service metric, anomalous values being values for the service metric outside the normal value range;
   detecting a performance issue with the computerized service;
   determining, in response to detecting the performance issue with the computerized service, whether one or more of the values for the service metric are anomalous;
   automatically setting, in accordance with whether one or more of the values for the service metric are anomalous, a value of a service level threshold for the service metric;
   determining whether a service level threshold for the service metric exists;
   automatically setting, in accordance with whether the one or more values for the service metric are anomalous, the value of the service level threshold for the service metric comprises automatically, in response to determining that the one or more values for the service metric are anomalous and in response to determining that a service level threshold for the service metric does not exist:
      establishing the service level threshold for the service metric; and
      setting the value of the service level threshold to a predetermined initial value.

13. The computer-implemented method of claim 12, wherein:
   the method further comprises:
      determining whether a service level threshold for the service metric exists; and
      determining whether one or more values for the service metric breach a current value of the service level threshold; and
   automatically setting, in accordance with whether the one or more values for the service metric are anomalous, the value of the service level threshold for the service metric comprises automatically adjusting, in response to determining that the one or more values for the service metric are anomalous, that a service level threshold for the service metric exists, and that the one or more values for the service metric do not breach the current value of the service level threshold, the current value of the service level threshold by a predetermined adjustment amount.

14. The computer-implemented method of claim 12, wherein:
   the method further comprises determining whether a service level threshold for the service metric exists; and
   automatically setting, in accordance with whether the one or more values for the service metric are anomalous, the value of the service level threshold for the service metric comprises automatically leaving, in response to determining that the one or more values for the service metric are not anomalous and that a service level threshold for the service metric exists, the value of the service level threshold as a current value of the service level threshold.

15. The computer-implemented method of claim 12, wherein:
   the method further comprises:
      determining whether a service level threshold for the service metric exists; and
      determining whether a current value of the service level threshold was set manually;
   automatically setting, in accordance with whether the one or more values for the service metric are anomalous, the value of the service level threshold for the service metric comprises automatically leaving, in response to not determining that the one or more values for the service metric are anomalous, that a service level threshold for the service metric exists, and that the current value of the service level threshold was set manually, the value of the service level threshold as a current value of the service level threshold; and
   the method further comprises generating, in response to determining that the current value of the service level threshold was set manually, an alert that comprises a proposed new value for the service level threshold.

16. The computer-implemented method of claim 12, further comprising storing, in a service level threshold adjustment log, information associated with the value of the service level threshold and associated values of the service metric.

17. The computer-implemented method of claim 16, wherein:
- wherein the service level threshold adjustment log comprises time series data for values of the service level threshold over time; and
- the method further comprises analyzing, using one or more machine learning models, the time series data, wherein the one or more machine learning models are trained to identify one or more patterns for the values of the service level threshold.

18. One or more non-transitory computer-readable storage media storing programming for execution by one or more processors, the programming comprising instructions to: monitor, over time, values for a service metric associated providing a computerized service over a communication network; evaluate, according to a statistical model, the values for the service metric to determine whether the values are anomalous values, the statistical model comprising a predicted distribution of the values for the service metric and a normal value range within the predicted distribution of the values for the service metric, anomalous values being values for the service metric outside the normal value range; detect a performance issue with the computerized service; determine, in response to detecting the performance issue with the computerized service, whether one or more of the values for the service metric are anomalous; and automatically set, in accordance with whether the one or more values for the service metric are anomalous, a value of a service level threshold for the service metric;
- determine whether a service level threshold for the service metric exists: automatically set, in accordance with whether the one or more values for the service metric are anomalous, the value of the service level threshold for the service metric comprise instructions to automatically, in response to determining that the one or more values for the service metric are anomalous and in response to determining that a service level threshold for the service metric does not exist: establish the service level threshold for the service metric; and set the value of the service level threshold to a predetermined initial value.

* * * * *